(12) United States Patent
Gulati et al.

(10) Patent No.: US 11,375,464 B2
(45) Date of Patent: Jun. 28, 2022

(54) SIDELINK SYNCHRONIZATION PRIORITY RULES

(71) Applicant: QUALCOMM Incorporated, San Diego, CA (US)

(72) Inventors: Kapil Gulati, Hillsborough, NJ (US); Arjun Bharadwaj, Poway, CA (US); Shuanshuan Wu, San Diego, CA (US); Tien Viet Nguyen, Bridgewater, NJ (US); Sudhir Kumar Baghel, Hillsborough, NJ (US)

(73) Assignee: Qualcomm Incorporated, San Diego, CA (US)

( * ) Notice: Subject to any disclaimer, the term of this patent is extended or adjusted under 35 U.S.C. 154(b) by 179 days.

(21) Appl. No.: 16/542,285

(22) Filed: Aug. 15, 2019

(65) Prior Publication Data

US 2021/0051617 A1 Feb. 18, 2021

(51) Int. Cl.
*H04W 56/00* (2009.01)

(52) U.S. Cl.
CPC .............................. *H04W 56/0005* (2013.01)

(58) Field of Classification Search
CPC .................................................. H04W 56/0005
See application file for complete search history.

(56) References Cited

U.S. PATENT DOCUMENTS

| 2016/0174179 A1 | 6/2016 | Seo et al. |
| 2016/0212721 A1 | 7/2016 | Sheng et al. |
| 2018/0139710 A1 | 5/2018 | Li et al. |
| 2018/0199298 A1* | 7/2018 | Wakabayashi ...... H04W 56/001 |
| 2019/0098589 A1 | 3/2019 | Chae et al. |
| 2019/0159150 A1 | 5/2019 | Nguyen et al. |
| 2019/0357166 A1* | 11/2019 | Blasco Serrano ........................... H04W 56/0015 |

OTHER PUBLICATIONS

R1-1907025, 'On synchronization procedures for NR V2X sidelink', Mitsubishi Electric, 3GPP TSG WG1 #97, May 13-17, 2019, pp. 1-6. (Year: 2019).*
R2-1905585, 'Summary of [105bis#32] PC5-RRC signaling', OPPO, 3GPP TSG-RAN WG2 Meeting #106, May 13-17, 2019. (Year: 2019).*
International Search Report and Written Opinion—PCT/US2020/046102—ISA/EPO—dated Feb. 24, 2021 (193191 WO).

* cited by examiner

*Primary Examiner* — Melvin C Marcelo
(74) *Attorney, Agent, or Firm* — Holland & Hart LLP

(57) ABSTRACT

Methods, systems, and devices for wireless communications are described. A user equipment (UE) may receive a first kind of synchronization signals from a first synchronization source and may receive a second kind of synchronization signals from a second synchronization source. Additionally, the UE may determine a first priority for the first synchronization source and a second priority for the second synchronization source based on whether each synchronization source is connected to a global navigation satellite system from information in the synchronization signals. Accordingly, the UE may then select the synchronization source with the higher priority and communicate with one or more additional UEs based on synchronizing with the selected synchronization source. In some cases, the first kind of synchronization signals may include sidelink synchronization signals, and the second kind of synchronization signals may include data-based synchronization signals (e.g., demodulation reference signals).

42 Claims, 12 Drawing Sheets

SIDELINK SYNCHRONIZATION PRIORITY RULES

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some cases, a UE may synchronize with a synchronization source prior to communicating with the synchronization source. However, the UE may receive synchronization signals from multiple synchronization sources, thereby impacting the ability of the UE to determine with which synchronization source to synchronize and, subsequently, communicate.

SUMMARY

The described techniques relate to improved methods, systems, devices, and apparatuses that support techniques for synchronizing based on sidelink synchronization signal prioritization. For example, the described techniques provide for a user equipment (UE) to receive a first kind of synchronization signals from a first synchronization source (e.g., a first UE) and to receive a second kind of synchronization signals from a second synchronization source (e.g., a second UE), where the UE determines a first priority for the first synchronization source based on the first kind of synchronization signals and a second priority for the second synchronization source based on the second kind of synchronization signals. Accordingly, the UE may then select the first synchronization source or the second synchronization source based on which synchronization source has a higher priority and communicate with one or more additional UEs based on synchronizing with the selected synchronization source (e.g., via sidelink communications). Additionally, the UE may use power parameter values (e.g., a reference signal received power (RSRP), a reference signal received quality (RSRQ), a signal-to-noise ratio (SNR), a signal-to-interference-plus-noise ratio (SINR), etc.) for each synchronization source when determining the respective priorities and selecting a synchronization source.

In some cases, the first kind of synchronization signals may include sidelink synchronization signals (e.g., sidelink primary synchronization signals (S-PSSs), sidelink secondary synchronization signals (S-SSSs), physical sidelink broadcast channel (PSBCH), etc.), and the second kind of synchronization signals may include data-based synchronization signals (e.g., demodulation reference signals (DMRSs) transmitted with sidelink data transmissions), or vice versa (e.g., the first kind of synchronization signals may include data-based synchronization signals and the second kind of synchronization signals may include sidelink synchronization signals). Additionally, the UE may determine the priority for each kind of synchronization signal based on if the synchronization sources are directly connected to a global navigation satellite system (GNSS), or not, and may prioritize and select the synchronization source directly connected to the GNSS. If both synchronization sources are directly connected to the GNSS or both are not directly connected to the GNSS, the UE may determine the priority and select a synchronization source based on the power parameter values, or a tie-breaking rule (e.g., selecting the synchronization signals that include the sidelink synchronization signals), etc.

A method of wireless communications at a UE is described. The method may include receiving, from a first synchronization source, one or more synchronization signals of a first kind, receiving, from a second synchronization source, one or more synchronization signals of a second kind, determining a first priority for the first synchronization source based on the one or more synchronization signals of the first kind and a second priority for the second synchronization source based on the one or more synchronization signals of the second kind, selecting the first synchronization source or the second synchronization source as a synchronization source for the UE based on the determined first priority and the determined second priority, and communicating with one or more UEs based on synchronizing with the selected synchronization source.

An apparatus for wireless communications at a UE is described. The apparatus may include a processor, memory coupled with the processor, and instructions stored in the memory. The instructions may be executable by the processor to cause the apparatus to receive, from a first synchronization source, one or more synchronization signals of a first kind, receive, from a second synchronization source, one or more synchronization signals of a second kind, determine a first priority for the first synchronization source based on the one or more synchronization signals of the first kind and a second priority for the second synchronization source based on the one or more synchronization signals of the second kind, select the first synchronization source or the second synchronization source as a synchronization source for the UE based on the determined first priority and the determined second priority, and communicate with one or more UEs based on synchronizing with the selected synchronization source.

Another apparatus for wireless communications at a UE is described. The apparatus may include means for receiving, from a first synchronization source, one or more synchronization signals of a first kind, receiving, from a second synchronization source, one or more synchronization signals of a second kind, determining a first priority for the first synchronization source based on the one or more synchronization signals of the first kind and a second priority for the second synchronization source based on the one or more synchronization signals of the second kind, selecting the first synchronization source or the second synchronization source as a synchronization source for the UE based on the determined first priority and the determined second priority, and communicating with one or more UEs based on synchronizing with the selected synchronization source.

A non-transitory computer-readable medium storing code for wireless communications at a UE is described. The code may include instructions executable by a processor to receive, from a first synchronization source, one or more synchronization signals of a first kind, receive, from a second synchronization source, one or more synchronization signals of a second kind, determine a first priority for the first synchronization source based on the one or more synchronization signals of the first kind and a second priority for the second synchronization source based on the one or more synchronization signals of the second kind, select the first synchronization source or the second synchronization source as a synchronization source for the UE based on the determined first priority and the determined second priority, and communicate with one or more UEs based on synchronizing with the selected synchronization source.

In some examples of the method, apparatuses, and non-transitory computer-readable medium described herein, selecting the synchronization sources for the UE may include operations, features, means, or instructions for determining, for the first synchronization source, a first value of a power parameter, determining, for the second synchronization source, a second value of the power parameter, and selecting the first synchronization source or the second synchronization source as a synchronization source for the UE based on the determined first priority, the determined second priority, the determined first value, and the determined second value.

In some examples of the method, apparatuses, and non-transitory computer-readable medium described herein, the power parameter includes an RSRP, an RSRQ, an SNR, an SINR, or a combination thereof.

Some examples of the method, apparatuses, and non-transitory computer-readable medium described herein may further include operations, features, means, or instructions for receiving, from the first synchronization source, synchronization information associated with the one or more synchronization signals of the first kind and determining whether the first synchronization source may be connected to a GNSS based on the received synchronization information, where the first priority for the first synchronization source may be determined based on whether the first synchronization source is connected to the GNSS.

In some examples of the method, apparatuses, and non-transitory computer-readable medium described herein, the synchronization information of the one or more synchronization signals of the first kind includes a primary synchronization signal (PSS) identification (ID), a secondary synchronization signal (SSS) ID, in-coverage information in a PSBCH signal, resources on which the one or more synchronization signals of the first kind may be received, or a combination thereof.

In some examples of the method, apparatuses, and non-transitory computer-readable medium described herein, the first priority may be a first level if the first synchronization source is connected to the GNSS and a second level that is lower than the first level if the first synchronization source is not connected to the GNSS.

Some examples of the method, apparatuses, and non-transitory computer-readable medium described herein may further include operations, features, means, or instructions for receiving, from the second synchronization source, a synchronization state indication associated with the one or more synchronization signals of the second kind and determining whether the second synchronization source may be connected to a GNSS based on the received synchronization state indication, where the second priority for the second synchronization source may be based on whether the second synchronization source is connected to the GNSS.

In some examples of the method, apparatuses, and non-transitory computer-readable medium described herein, the second priority may be a first level if the second synchronization source is connected to the GNSS and a second level that is lower than the first level if the second synchronization source is not connected to the GNSS.

In some examples of the method, apparatuses, and non-transitory computer-readable medium described herein, selecting the first synchronization source or the second synchronization source further may include operations, features, means, or instructions for identifying that the determined first priority may be a same priority as the determined second priority and selecting the first synchronization source or the second synchronization source based on a tie-breaking rule.

Some examples of the method, apparatuses, and non-transitory computer-readable medium described herein may further include operations, features, means, or instructions for determining a value of a power parameter for the second synchronization source and comparing the determined value of the power parameter to a threshold value.

In some examples of the method, apparatuses, and non-transitory computer-readable medium described herein, selecting the first synchronization source or the second synchronization source may include operations, features, means, or instructions for selecting the second synchronization source based on the determined second priority being higher than the determined first priority and the determined value of the power parameter satisfying the threshold value.

In some examples of the method, apparatuses, and non-transitory computer-readable medium described herein, selecting the first synchronization source or the second synchronization source may include operations, features, means, or instructions for selecting the first synchronization source based on the second priority being higher than the first priority and the determined value of the power parameter failing to satisfy the threshold value.

Some examples of the method, apparatuses, and non-transitory computer-readable medium described herein may further include operations, features, means, or instructions for receiving an indication of the threshold value.

Some examples of the method, apparatuses, and non-transitory computer-readable medium described herein may further include operations, features, means, or instructions for transmitting an indication of a UE capability for the UE to support the first kind of synchronization signals and the second kind of synchronization signals.

In some examples of the method, apparatuses, and non-transitory computer-readable medium described herein, the one or more synchronization signals of the first kind include a sidelink synchronization signal or a DMRS, and the one or more synchronization signals of the second kind include a different one of the sidelink synchronization signal or the DMRS.

In some examples of the method, apparatuses, and non-transitory computer-readable medium described herein, the sidelink synchronization signal includes a PSS, an SSS, and a PSBCH signal.

In some examples of the method, apparatuses, and non-transitory computer-readable medium described herein, the first synchronization source may include a first UE, and the second synchronization source may include a second UE.

DETAILED DESCRIPTION

Figure 1:
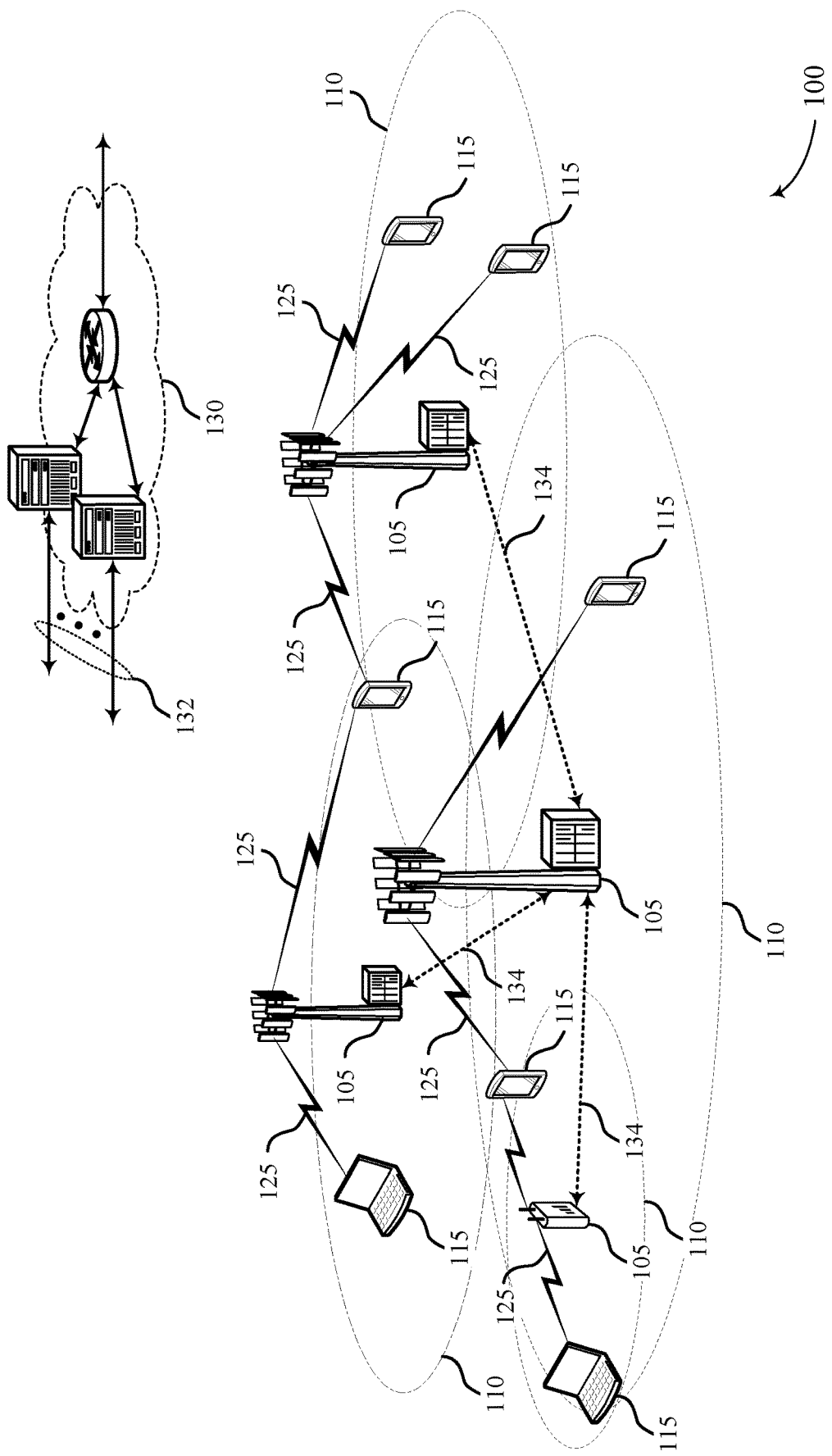
FIG. 1 illustrates an example of a system for wireless communications that supports sidelink synchronization priority rules in accordance with aspects of the present disclosure.

In some wireless communications systems, a user equipment (UE) may receive synchronization signals from a synchronization source (e.g., synchronous source or UE, or synchronization UE) to enable the UE to synchronize with the synchronization source prior to establishing a connection and communicate with the synchronization source. For example, the synchronization signals may allow the UE to transmit and receive messages with the synchronization source according to timings as indicated by the synchronization signals (e.g., the UE adjusts timings to align with timings of the synchronization source). In some cases, the synchronization source may be a base station, a synchronization reference UE, or a similar wireless device that is connected to a global navigation satellite system (GNSS), where the timings associated with the synchronization signals are determined from the GNSS. Additionally or alternatively, the synchronization source may be directly or indirectly connected and synchronized with the GNSS (e.g., via an in-coverage UE or an out-of-coverage UE). In some cases, the synchronization source may be outside of a coverage area for the GNSS and may determine timings to indicate with the synchronization signals without the aid of the GNSS. Accordingly, the UE attempting to establish the connection with the synchronization source, where the synchronization source is within (e.g., directly or indirectly) or outside the GNSS coverage, may receive sidelink synchronization signals from the synchronization source for the synchronization. In some cases, the UE may receive multiple sidelink synchronization signals from respective multiple synchronization sources but may not know which synchronization source to select.

As described herein, the UE may receive a first kind of synchronization signals (e.g., sidelink primary synchronization signals (S-PSSs) and sidelink secondary synchronization signals (S-SSSs), etc., transmitted with a physical sidelink broadcast channel (PSBCH)) from a first synchronization source (e.g., a first UE) and may receive a second kind of synchronization signals (e.g., demodulation reference signals (DMRSs) transmitted with sidelink data transmissions) from a second synchronization source (e.g., a second UE). Accordingly, the UE may determine a first priority for the first synchronization source based on the first kind of synchronization signals and a second priority for the second synchronization source based on the second kind of synchronization signals. In some cases, the UE may then select the first synchronization source or the second synchronization source based on which synchronization source has a higher priority and communicate with one or more additional UEs based on synchronizing with the selected synchronization source (e.g., via sidelink communications). Additionally, the UE may use power parameter values (e.g., a reference signal received power (RSRP), a reference signal received quality (RSRQ), a signal-to-noise ratio (SNR), a signal-to-interference-plus-noise ratio (SINR), etc.) for each synchronization source when determining the respective priorities and selecting a synchronization source. In some cases, the UE may determine the priority for each kind of synchronization signal based on if the synchronization sources are directly connected to a GNSS (e.g., higher priority) or not directly connected to the GNSS (e.g., lower priority) and may prioritize and select the synchronization source directly connected to the GNSS.

Aspects of the disclosure are initially described in the context of a wireless communications system. Additionally, aspects of the disclosure are illustrated through an additional wireless communications system, synchronization signal coverages, a synchronization signal block, and a process flow. Aspects of the disclosure are further illustrated by and described with reference to apparatus diagrams, system diagrams, and flowcharts that relate to sidelink synchronization priority rules.

FIG. 1 illustrates an example of a wireless communications system 100 that supports sidelink synchronization priority rules in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in a physical broadcast channel (PBCH). In some cases, the PSS, SSS, and PBCH may be received in a synchronization signal/PBCH block (SSB). The MIB may contain system bandwidth information, an SFN, and a physical channel HARQ indicator channel (PHICH) configuration. After decoding the MIB, the UE 115 may receive one or more system information blocks (SIBs). For example, a first SIB (SIB1) may contain cell access parameters and scheduling information for other SIBs. Decoding SIB1 may enable the UE 115 to receive a second SIB (SIB2). SIB2 may contain RRC configuration information related to random access channel (RACH) procedures, paging, physical uplink control channel (PUCCH), physical uplink shared channel (PUSCH), power control, sounding reference signal (SRS), and cell barring.

In some cases, wireless communication system 100 may include or support networks used for vehicle-based communications, also referred to as vehicle-to-everything (V2X), enhanced V2X (eV2X), vehicle-to-vehicle (V2V) networks, cellular V2X (C-V2X) networks, or other similar networks. Vehicle based communication networks may provide always-on telematics where UEs, e.g., vehicle UEs (v-UEs), communicate directly to the network (V2N), to pedestrian UEs (V2P), to infrastructure devices (V2I), and to other v-UEs (e.g., via the network and/or directly). The vehicle-based communication networks may support a safe, always-connected driving experience by providing intelligent connectivity where traffic signal/timing, real-time traffic and routing, safety alerts to pedestrians/bicyclist, collision avoidance information, etc., are exchanged.

Some wireless communications systems (e.g., including V2X communications) may include D2D communications. For example, a first UE 115 may communicate with an additional UE 115 over sidelink channels. In the sidelink communications, the first UE 115 may synchronize with a synchronization source (e.g., the additional UE 115) prior to establishing a connection and communicating with the synchronization source (e.g., similar to the synchronization procedures described above). Accordingly, for sidelink synchronization, the first UE 115 may receive sidelink PSSs (S-PSSs), sidelink SSSs (S-SSSs), a physical sidelink broadcast channel (PSBCH), etc., where the S-PSS, S-SSS, and PSBCH are received in a sidelink SSB (S-SSB).

Additionally, the first UE 115 may use reduced complexity synchronization procedures (e.g., data-aided, synchronous S-SSB, etc.) when synchronizing with the synchronization source. In some cases, the synchronization sources may include a GNSS, a base station 105 (e.g., eNB, gNB, etc.), a synchronization reference UE (e.g., SyncRef UE), etc. A baseline synchronization source may include GNSS and base station-based synchronization. In some cases, the first UE 115 may include a UE capability that includes support of an S-SSB based synchronization (e.g., with a SyncRef UE as source). Additionally, the first UE 115 may also include a UE capability that includes support of the reduced complexity synchronization procedures. Accordingly, the first UE 115 may use a data-aided/non-SSB based synchronization mechanism, a synchronous-SSB based synchronization mechanism (e.g., perform S-SSB search within a time window), or a combination thereof. In some cases, GNSS based synchronization alone may not be sufficient or robust for different use cases (e.g., V2X communications).

In some cases, a UE 115 may receive multiple types (e.g., kinds) of synchronization signals at a given time from multiple corresponding synchronization sources and may identify a priority based on the different synchronization sources when determining which synchronization source with which to connect. For example, the UE 115 may be out-of-coverage of a GNSS and may perform a synchronization procedure (e.g., a distributed synchronization procedure, S-SSB based distributed synchronization, etc.) based on different synchronization sources (e.g., including different priorities/hops of SyncRef UEs) having different priorities. In some cases, the UE 115 may use a priority order for out-of-coverage operation when GNSS is configured to be higher priority than a base station 105 (e.g., as indicated for V2X communications). This priority order may include a GNSS having a highest priority, a synchronization source (e.g., SyncRef UE) directly synchronized to the GNSS having a second highest priority, a synchronization source (e.g., SyncRef UE) indirectly synchronized to the GNSS via an in-coverage UE having a third highest priority, a synchronization source (e.g., SyncRef UE) indirectly synchronized to the GNSS via an out-of-coverage UE having a fourth highest priority, and independent synchronization sources (e.g., independent SyncRef UEs) having a lowest priority.

Figure 2:
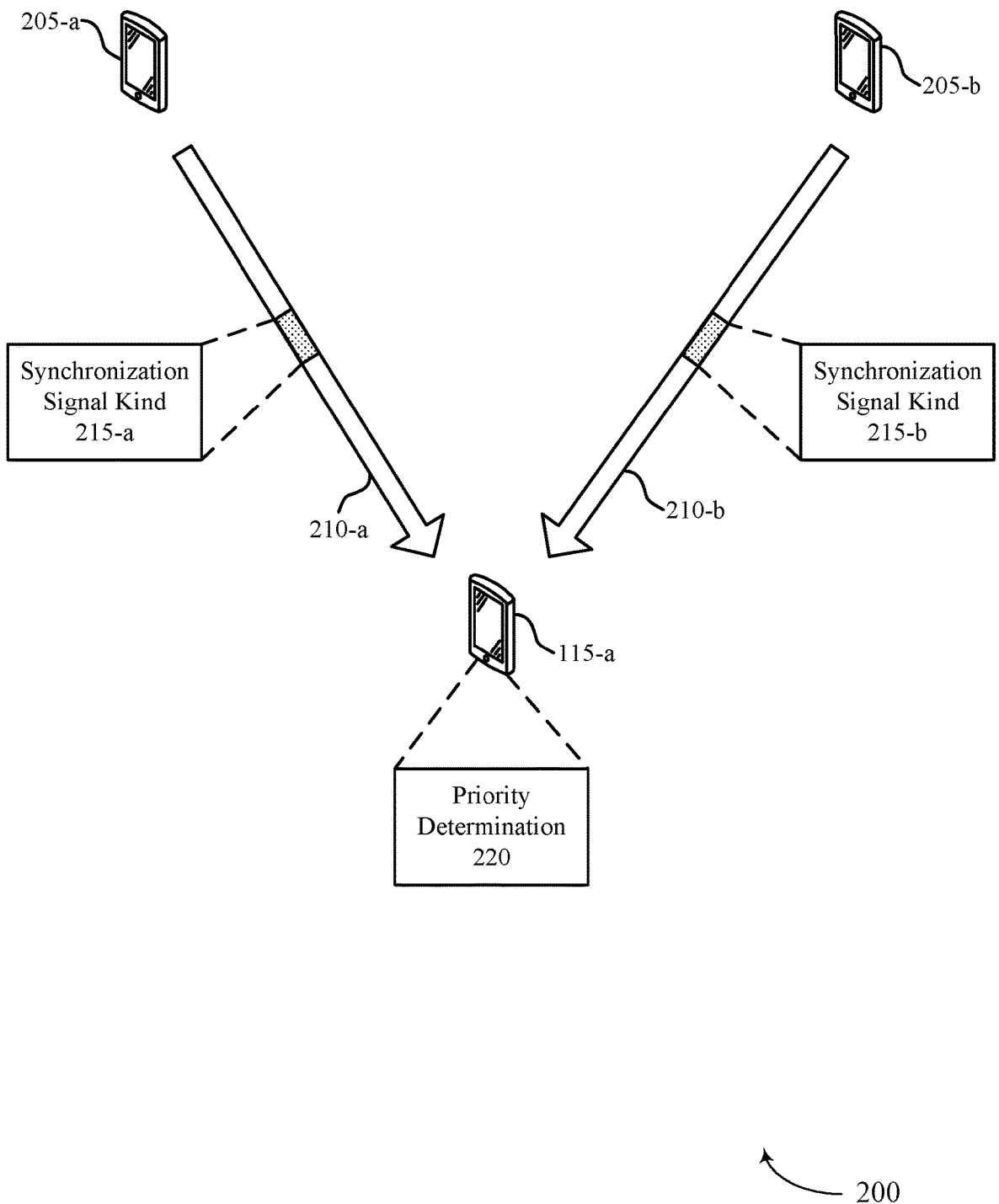
FIG. 2 illustrates an example of a wireless communications system that supports sidelink synchronization priority rules in accordance with aspects of the present disclosure.

FIG. 2 illustrates an example of a wireless communications system 200 that supports sidelink synchronization priority rules in accordance with aspects of the present disclosure. In some examples, wireless communications system 200 may implement aspects of wireless communication system 100. Wireless communications system 200 may include a UE 115-a and one or more synchronization sources 205 (e.g., synchronization sources, synchronization reference UEs, SyncRef UEs, etc.) that provide synchronization information (e.g., S-PSS, S-SSS, PSBCH, S-SSB, etc.) to UE 115-a, where the synchronization sources 205 and UE 115-a may represent examples of UEs 115 as described above with reference to FIG. 1. For example, a first synchronization source 205-a and a second synchronization source 205-b may transmit respective synchronization signals to UE 115-a on a first sidelink 210-a and a second sidelink 210-b (e.g., first synchronization source 205-a uses sidelink 210-a and second synchronization source 205-b uses sidelink 210-b). Accordingly, UE 115-a may attempt to establish sidelink communications with one or both synchronization sources 205. While synchronization sources 205 are both shown as UEs 115 in the example of FIG. 2, it is understood that synchronization sources 205 may include any wireless device capable of supporting synchronization (e.g., base station 105, GNSS, etc.).

In some cases, UE 115-a may receive different kinds of synchronization signals than sidelink synchronization signals (e.g., S-PSS, S-SSS, PSBCH, S-SSB, etc.) from a synchronization source 205 and, accordingly, perform a different kind of synchronization procedure based on the different kinds of synchronization signals. For example, UE 115-a may perform a data-aided synchronization procedure (e.g., non-SSB based synchronization) based on data transmissions received from a synchronization source 205. In some cases, the data-aided synchronization (e.g., data-based synchronization) may include receiving DMRSs with the data transmissions and perform the data-aided synchronization using the DMRSs. Conventionally, DMRSs may be used to enable coherent signal demodulation at a base station 105 from a UE 115. These DMRSs may be time multiplexed with uplink data and may be transmitted on a fourth or third symbol (e.g., for a single-carrier frequency division multiplexing (SC-FDMA) of an uplink TTI (e.g., slot) for normal or extended cyclic prefix (e.g., prefixing the uplink TTI with reference symbol(s) and with a repetition of the reference symbol(s) at the end of the slot), respectively, using a same bandwidth as the uplink data. Accordingly, a synchronization source 205 may also transmit DMRSs within a sidelink data transmission to enable a UE 115 to demodulate and receive the sidelink data transmission.

Some wireless communications systems (e.g., NR V2X) may use reduced complexity distributed synchronization procedures based on DMRSs of data transmissions (e.g., sidelink data transmissions) from GNSS connected synchronization sources (e.g., GNSS connected UEs). In some cases, a UE 115 may drift away from a synchronization source 205 such that the UE 115 stops transmitting to the synchronization source 205 based on transmission parameters degrading below transmission requirements and has lost synchronization with the synchronization source 205 but may still be able to receive transmissions from the synchronization source 205. If the UE 115 can still receive data packets (e.g., data transmissions) from GNSS connected synchronization sources, the UE 115 may derive time/frequency synchronization information based on DMRS of the data packets. Additionally, information on whether the synchronization source 205 is connected to the GNSS (e.g., GNSS coverage information) may be included as a MAC header in the data transmission (e.g., data fields added at the beginning of the data packet in order to turn the data packet into a frame to be transmitted).

In some examples, a first UE 115 may use a non-SSB based synchronization procedure (e.g., a data-based or data-aided synchronization procedure) when GNSS coverage is not available for the first UE 115. For example, if the first UE 115 can receive and decode data packet(s) from another UE 115 (e.g., a potential SyncRef UE, a synchronization source 205, etc.), the first UE 115 may determine if a GNSS coverage indicator in the MAC header of the data packet(s) from the other UE 115 is set to true (e.g., indicating the other UE 115 is connected to a GNSS). Subsequently, if the other UE 115 is connected to the GNSS, the first UE 115 may measure a power value (e.g., RSRP, RSRQ, SNR, SINR, etc.) on DMRSs of a physical sidelink shared channel (PSSCH) that the data packet(s) are received over and determine whether the power value exceeds a configured threshold (e.g., indicated by a base station 105, a network configured value, etc.).

Additionally, the first UE 115 may determine whether the power value measured on the DMRS of the PSSCH exceeds a last measured power value of a previously selected synchronization source 205 (e.g., a previously selected SyncRef UE), which may indicate the other UE 115 provides a better channel quality (e.g., higher power value) than a current/previous synchronization source 205. If all of the above criteria are met (e.g., other UE 115 is in-coverage of the GNSS, the power value exceeds the threshold, and the power value for the other UE 115 is greater than power values for the previous synchronization source 205), the first UE 115 may then select the other UE 115 (e.g., the potential SyncRef UE) as a synchronization reference for time/frequency synchronization. In some cases, support of S-SSB (e.g., sidelink) based synchronization and data-aided/non-SSB synchronization may be indicated as UE supported capabilities by the first UE 115 (e.g., different UE capabilities).

Accordingly, as an example shown in FIG. 2, UE 115-*a* may be capable of both S-SSB and data-aided (e.g., DMRS) based synchronization procedures. In some cases, UE 115-*a* may indicate this capability to synchronization sources 205, base stations 105, a network, etc. (e.g., as part of a UE capability report). However, if UE 115-*a* is synchronized to a synchronization source 205 that uses an S-SSB based synchronization procedure (e.g., an S-SSB SyncRef UE) that is indirectly connected to a GNSS but can also receive data packets (e.g., data transmissions) from another synchronization source 205 that uses a non-S-SSB synchronization procedure (e.g., a data-aided/data-based synchronization procedure from a non-SSB SyncRef UE) that is connected directly to the GNSS (e.g., as indicated in a MAC control element (MAC CE)), then UE 115-*a* may not know which synchronization source 205 should be given higher priority to derive time/frequency synchronization.

For the S-SSB based synchronization procedure, whether the synchronization source 205 is directly or indirectly synchronized to the GNSS may be determined by a sidelink synchronization signal ID (e.g., PSS/SSS ID/INC bit in PSBCH), and for the data (e.g., DMRS) based synchronization procedure (e.g., non-SSB/data-aided/data-based synchronization), whether the synchronization source 205 is directly or indirectly synchronized to the GNSS may be determined by MAC CE content in the transmitted data packets. In some cases, the non-S-SSB synchronization source 205 that is synchronized to the GNSS (e.g., GNSS connected UE) may not support S-SSB, and, hence, UE 115-*a* (e.g., a receiving UE) may not receive S-SSBs from the GNSS connected synchronization source 205 and may receive S-SSBs from a non-GNSS synchronized synchronization source 205 transmitting S-SSBs. Accordingly, UE 115-*a* may need priority rules between the S-SSB based synchronization procedures and the data (e.g., DMRS) based synchronization procedures when UE 115-*a* supports both.

As shown and as an example for FIG. 2, first synchronization source 205-*a* may support the S-SSB based synchronization procedure (e.g., a first kind of synchronization signals), and second synchronization source 205-*b* may support the data-based (e.g., DMRS based) synchronization procedure (e.g., a second kind of synchronization signals). Accordingly, UE 115-*a* may receive different synchronization signal kinds 215 from each synchronization source 205 on the respective sidelinks 210. For example, UE 115-*a* may receive one or more synchronization signals of a first synchronization signal kind 215-*a* from first synchronization source 205-*a* on first sidelink 210-*a* and may receive one or more synchronization signals of a second synchronization signal kind 215-*b* from second synchronization source 205-*b* on second sidelink 210-*b*. In some cases, first synchronization signal kind 215-*a* may include one or more of S-PSSs, S-SSSs, PSBCH physical signals and channels, etc. (e.g., for the S-SSB based synchronization procedure). Additionally or alternatively, second synchronization signal kind 215-*b* may include DMRSs transmitted as part of a data transmissions from second synchronization source 205-*b* on second sidelink 210-*b* (e.g., on a PSSCH).

Accordingly, UE 115-*a* may then perform a priority determination 220 to determine priorities of first synchronization source 205-*a* and second synchronization source 205-*b* based on synchronization information transmitted with each synchronization signal kind 215 from the corresponding synchronization sources 205. For example, UE 115-*a* may determine a priority for first synchronization source 205-*a* based on whether or not first synchronization source 205-*a* is directly synchronized with a GNSS, where the direct GNSS synchronization is identified based on a synchronization signal (e.g., PSS and/or SSS) sequence ID, additional information (e.g., in-coverage information) included in a PSBCH, and a resource of which the first synchronization signal kind 215-*a* (e.g., S-SSB) is transmitted. If first synchronization source 205-*a* is determined to be directly synchronized to the GNSS, UE 115-*a* may assign a higher priority level (e.g., P1 priority) to first synchronization source 205-*a* and may assign a lower priority level (e.g., P2 priority) to first synchronization source 205-*a* if not directly synchronized to the GNSS.

For second synchronization source 205-*b*, UE 115-*a* may determine whether second synchronization source 205-*b* is directly synchronized to the GNSS based on additional information in data transmissions from second synchronization source 205-*b* (e.g., via a MAC header, a MAC CE, etc., in the data transmissions). Accordingly, UE 115-*a* may perform priority determination 220 to determine a priority for second synchronization source 205-*b* based on whether or not second synchronization source 205-*b* is directly synchronized with a GNSS, where the direct GNSS synchronization is identified based on the additional information indicating a GNSS synchronization state of second synchronization source 205-*b* included in the data transmission. If second synchronization source 205-*b* is determined to be directly synchronized to the GNSS, UE 115-*a* may assign a higher priority level (e.g., P1 priority) to second synchronization source 205-*b* and may assign a lower priority level (e.g., P2 priority) to second synchronization source 205-*b* if not directly synchronized to the GNSS. In some cases, UE 115-*a* may perform priority determination 220 (e.g., using priority rules as described above) based on UE 115-*a* being capable of deriving time/frequency synchronization from both first synchronization signal kind 215-*a* (e.g., S-SSB based synchronization signals) and second synchronization signal kind 215-*b* (e.g., data-based/data-aided/DMRS based synchronization signals).

After performing priority determination 220 for both first synchronization source 205-*a* and second synchronization source 205-*b*, UE 115-*a* may then select a synchronization source 205 (e.g., synchronization reference UE) for synchronization and subsequent communications with one or more additional UEs based on the synchronization. Accordingly, UE 115-*a* may determine the synchronization source 205 as either first synchronization source 205-*a* or second synchronization source 205-*b* depending on one or more of the priority of first synchronization source 205-*a* (e.g., P1 or P2) and the priority of second synchronization source 205-*b* (e.g., P1 or P2). Additionally, in some cases, UE 115-*a* may also use power parameter measurements of the different synchronization signal kinds 215 to select a synchronization source 205. For example, the power parameter measurements may include RSRPs, RSRQs, SNRs, SINRs, etc. In some cases, RSRP may indicate an average power of resource elements that carry synchronization signals over a corresponding bandwidth and, accordingly, may indicate the average received power of a single resource element. RSRQ may indicate a relationship between the RSRP and power from additional cells, adjacent channel interference, thermal noise, etc., and, as such, may indicate the quality of the received synchronization signals. SNR and SINR may indicate a level of the synchronization signals to the level of background noise (e.g., including interference for SINR).

Accordingly, UE 115-*a* may use first power parameter measurements of first synchronization source 205-*a* and second power parameter measurements of second synchronization source 205-*b* in addition to the determined priorities of the synchronization sources 205 as described above when selecting the synchronization source 205 for the synchronization and the subsequent communications.

In some cases, the determined priorities may be the same for each synchronization source 205. For example, first synchronization source 205-*a* and second synchronization source 205-*b* may both have the higher priority level (e.g., P1) indicating both synchronization sources 205 are directly synchronized to the GNSS or may both have the lower priority level (e.g., P2) indicating both synchronization sources 205 are not directly synchronized to the GNSS. Accordingly, if both priorities are the same, UE 115-*a* may select first synchronization source 205-*a* (e.g., the synchronization source 205 that uses the S-SSB based synchronization procedure) for the synchronization and the subsequent communications. Additionally, if the determined priority for first synchronization source 205-*a* is the higher priority level (e.g., P1, indicating a direct synchronization to the GNSS) and the determined priority for second synchronization source 205-*b* is the lower priority level (e.g., P2, indicating no direct synchronization to the GNSS), UE 115-*a* may also select first synchronization source 205-*a* for the synchronization and the subsequent communications based on the higher priority.

Additionally or alternatively, if the determined priority for second synchronization source 205-*b* is the higher priority (e.g., P1, indicating a direct synchronization to the GNSS) and the determined priority for first synchronization source 205-*a* is the lower priority (e.g., P2, indicating no direct synchronization to the GNSS), UE 115-*a* may select either first synchronization source 205-*a* or second synchronization source 205-*b*. For example, UE 115-*a* may select second synchronization source 205-*b* based on the higher determined priority (e.g., and second synchronization source 205-*b* being directly synchronized to the GNSS). Additionally or alternatively, UE 115-*a* may determine whether the second power parameter measurements (e.g., RSRP, RSRQ, SNR, SINR, etc., of second synchronization source 205-*b*) are above a threshold value, where the threshold value is indicated to UE 115-*a* via higher layer signaling (e.g., an RRC preconfigured/configured threshold), and may select the synchronization source 205 based on whether the second power parameter measurements are above the threshold value. Accordingly, if the second power parameter measurements are above the threshold value, UE 115-*a* may select second synchronization source 205-*b* for the synchronization and the subsequent communications. Alternatively, if the second power parameter measurements are below the threshold value, UE 115-*a* may select first synchronization source 205-*a* for the synchronization and the subsequent communications.

While first synchronization source 205-*a* is shown using the S-SSB based synchronization procedure and second synchronization source 205-*b* is shown using the data-based synchronization procedure in the example of FIG. 2, it is to be understood that the techniques described herein may apply to scenarios where first synchronization source 205-*a* uses the data-based synchronization procedure and second synchronization source 205-*b* uses the S-SSB based synchronization procedure.

Figure 3A:
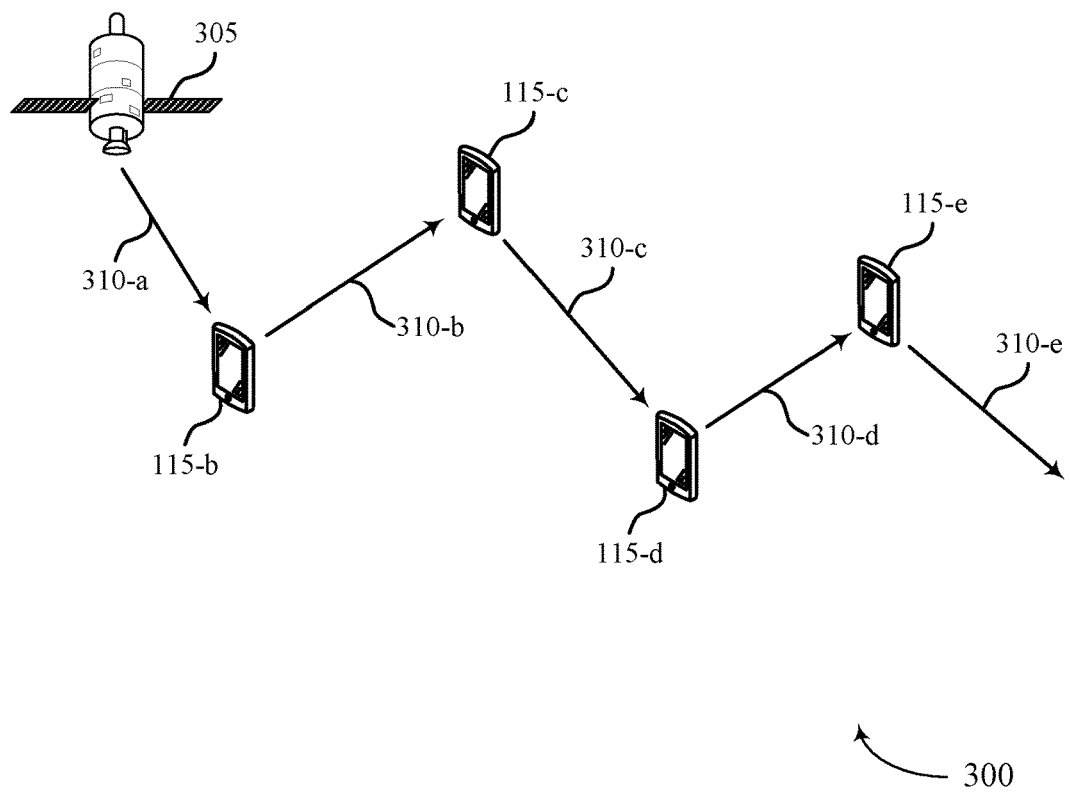
FIGS. 3A and 3B illustrate examples of synchronization signal coverages that support sidelink synchronization priority rules in accordance with aspects of the present disclosure.
Figure 3B:
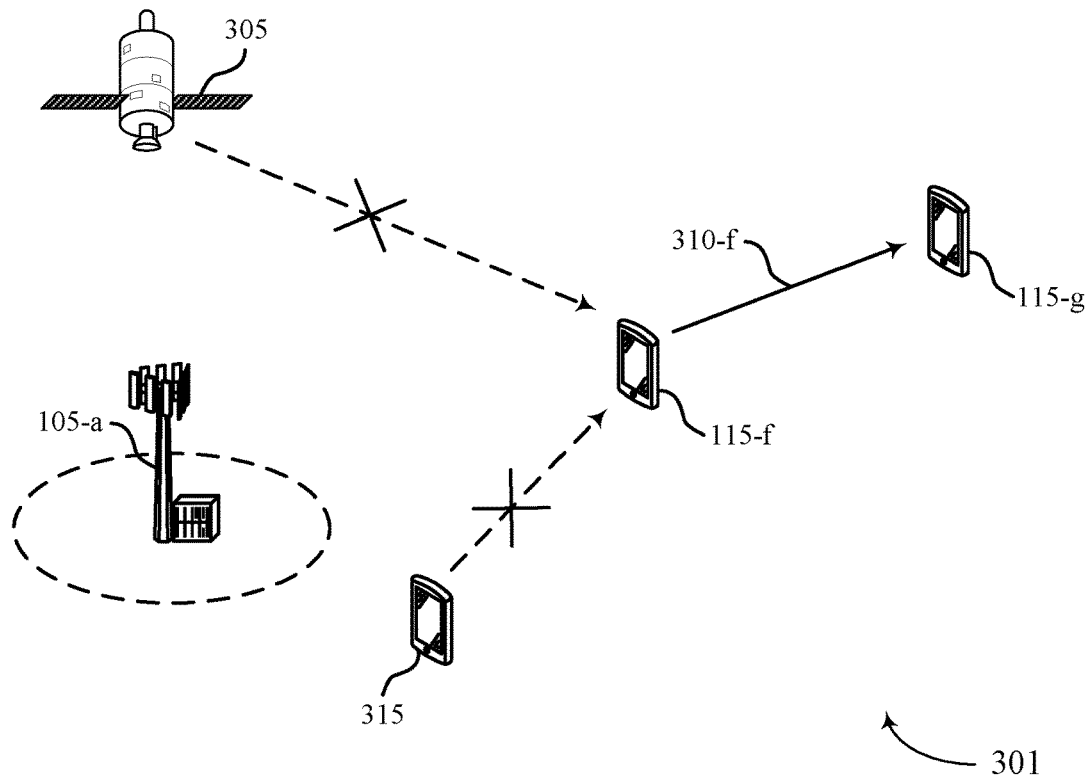

FIGS. 3A and 3B illustrate examples of synchronization signal coverages 300 and 301 that support sidelink synchronization priority rules in accordance with aspects of the present disclosure. In some examples, synchronization signal coverages 300 and 301 may implement aspects of wireless communications systems 100 and/or 200. Additionally, synchronization signal coverage 300 may illustrate an example of an in-GNSS coverage, and synchronization signal coverage 301 may illustrate an example of out-of-GNSS coverage. For example, the GNSS coverage may include a UE 115 being in direct or indirect contact with a satellite 305. In some cases, synchronization signal coverages 300 and 301 may be used as distributed synchronization procedures for one or more UEs 115, which may be examples of corresponding UEs 115 as described above with reference to FIGS. 1-2.

As shown in synchronization signal coverage 300, a first UE 115-*b* may have a connection 310-*a* that is direct to the satellite 305 (e.g., in-GNSS coverage). Accordingly, connection 310-*a* may indicate that the type of synchronization includes a GNSS based synchronization (e.g., typeSync=GNSS). First UE 115-*b* may then become a synchronization reference (e.g., SyncRef) for additional UEs 115. For example, a second UE 115-*c* may use a connection 310-*b* to synchronize and communicate with first UE 115-*b*, where connection 310-*b* includes a sidelink synchronization signal ID of 0 (e.g., indicating the synchronization signals are synchronized to the GNSS), a subframe resource to transmit/receive the synchronization signals (e.g., either a first or second resource in the subframe, such as a resource–1 or a resource–2), and an indication of whether first UE 115-*b* is in-coverage of the satellite 305 (e.g., in-coverage (INC)=TRUE).

Subsequently, in some cases, second UE 115-*c* may then transmit synchronization signals to a third UE 115-*d* on a connection 310-*c* based on the GNSS timings from first UE 115-*b*. For example, connection 310-*c* may include a sidelink synchronization signal ID of the source UE (e.g., first UE 115-*b*, where the sidelink synchronization signal ID is 0), a different subframe resource for transmitting/receiving the synchronization signals (e.g., subframe=resource–2), and an indication whether second UE 115-*c* is in-coverage of the satellite 305 (e.g., INC=FALSE). Additionally, third UE 115-*d* may then transmit synchronization signals to a fourth UE 115-*e* on a connection 310-*d* based on GNSS timings from first UE 115-*b* and relayed through second UE 115-*c*. For example, connection 310-*d* may include a sidelink synchronization signal ID of a source UE (e.g., second UE 115-*c*) plus 168 (e.g., 0 for second UE 115-*c*+168=168), a different subframe resource for transmitting/receiving the synchronization signals than second UE 115-*c* (e.g., source UE, whose subframe=resource–2, so subframe=resource–1 for third UE 115-*d*), and an indication whether third UE 115-*d* is in-coverage of the satellite 305 (e.g., INC=FALSE). Third UE 115-*d* may add 168 to the sidelink synchronization signal ID of the source UE to differentiate synchronization signals transmitted by each UE 115, since a same subframe resource is used.

Additionally, fourth UE 115-*e* may then provide synchronization information (e.g., the synchronization signals) to one or more UEs 115 down a chain of UEs 115 over a connection 310-*e*. For example, connection 310-*e* may include a sidelink synchronization signal ID of a source UE (e.g., third UE 115-*d*, where the sidelink synchronization signal ID is 168), a different subframe resource for transmitting/receiving the synchronization signals than third UE 115-*d* (e.g., source UE, whose subframe=resource–a, so subframe=resource–2 for fourth UE 115-*e*), and an indication whether fourth UE 115-*e* is in-coverage of the satellite 305 (e.g., INC=FALSE). UEs 115 may continue to transmit synchronization signals down the chain of UEs 115, where each subsequent UE 115 may use a same sidelink synchronization ID and an inverse resource as a previous UE 115 in the chain of UEs 115. Each connection 310 may include a resource selection, an S-SSB ID determination (e.g., sidelink synchronization signal ID), an indication of a synchronization reference selection/reselection, etc. In some cases, a synchronization reference UE 115 (e.g., a UE 115 that transmits synchronization signals with timings from the GNSS) may be connected directly to a base station or the GNSS (e.g., satellite 305), may be connected indirectly (e.g., greater than one hop from the base station or the GNSS), or may be an independent synchronization source. Additionally, a UE 115 may determine how many hops a synchronization reference UE 115 is away from a GNSS based on the sidelink synchronization ID and subframe resource used/indicated by the synchronization reference UE 115.

Additionally or alternatively, as shown in synchronization signal coverage 301, a UE 115 may be in an out-of-GNSS coverage scenario. For example, a UE 115-*f* may not be connected to a satellite 305 (e.g., GNSS coverage), may be outside of a geographic coverage area of a base station 105-*a*, may not be connected to a synchronization reference 315 (e.g., a UE), etc. Accordingly, UE 115-*f* may randomly select a sidelink synchronization signal ID from a first set of IDs reserved for synchronizations sources out-of-GNSS coverage (e.g., 170 to 355). Additionally, UE 115-*f* may also select a subframe resource to use for transmitting synchronization signals to additional UEs 115 nearby (e.g., subframe=resource–1 or resource–2) and an indication whether UE 115-*e* is in-coverage of the GNSS (e.g., INC=FALSE). UE 115-*e* may then indicate the randomly selected sidelink synchronization signal ID, the selected subframe resource, and the GNSS coverage indication for a connection 310-*f*. For example, a UE 115-*g* may receive synchronization signals via connection 310-*f* from UE 115-*f* according to the different parameters indicated above. In some cases, UE 115-*g* may then transmit synchronization signals to nearby UEs 115 using a sidelink synchronization signal ID same as a source UE for UE 115-*g* (e.g., sidelink synchronization signal ID for UE 115-*f*), an opposite subframe resource used by the source UE 115 (e.g., UE 115-*f*), and an indication of whether UE 115-*g* is in-coverage of the GNSS (e.g., INC=FALSE).

In some cases, when a UE 115 attempts to connect to a synchronization source (e.g., synchronous source), the UE 115 may receive different synchronization signals from corresponding different synchronization sources. Accordingly, the UE 115 may need to identify a priority for selecting one of the synchronization sources for subsequent communications. As described above with reference to FIG. 1, the UE 115 may use a priority order for out-of-coverage operation when a GNSS is configured to be a higher priority than a base station 105 (e.g., for V2X communications).

As shown in FIGS. 3A and 3B, the priority order may include satellite 305 (e.g., the GNSS) having the highest priority, a synchronization source (e.g., SyncRef UE) directly synchronized to the GNSS (e.g., UE 115-*b* as shown in FIG. 3A with a sidelink synchronization signal ID of 0 and INC=TRUE or with sidelink synchronization signal ID of 0 and using a resource–3) having a second highest priority, a synchronization source (e.g., SyncRef UE) indirectly synchronized to the GNSS via an in-coverage UE (e.g., UE 115-*c* as shown in FIG. 3A with a sidelink synchronization signal ID of 0, a subframe=resource–1 or resource–2, and INC=FALSE) having a third highest priority, a synchronization source (e.g., SyncRef UE) indirectly synchronized to the GNSS via an out-of-coverage UE (e.g., UE 115-*d* as shown in FIG. 3A with a sidelink synchronization signal ID of 168 or 169 and INC=FALSE) having a fourth highest priority, and independent synchronization sources (e.g., independent SyncRef UEs, such as UE 115-*f* as shown in FIG. 3B) having a lowest priority. Additionally, as described herein, the UE 115 may determine a priority for different synchronization sources based on the type of synchronization signals transmitted by the synchronization sources, power parameter values for the synchronization signals, if the synchronization source is connected to the GNSS, or a combination thereof.

Figure 4:
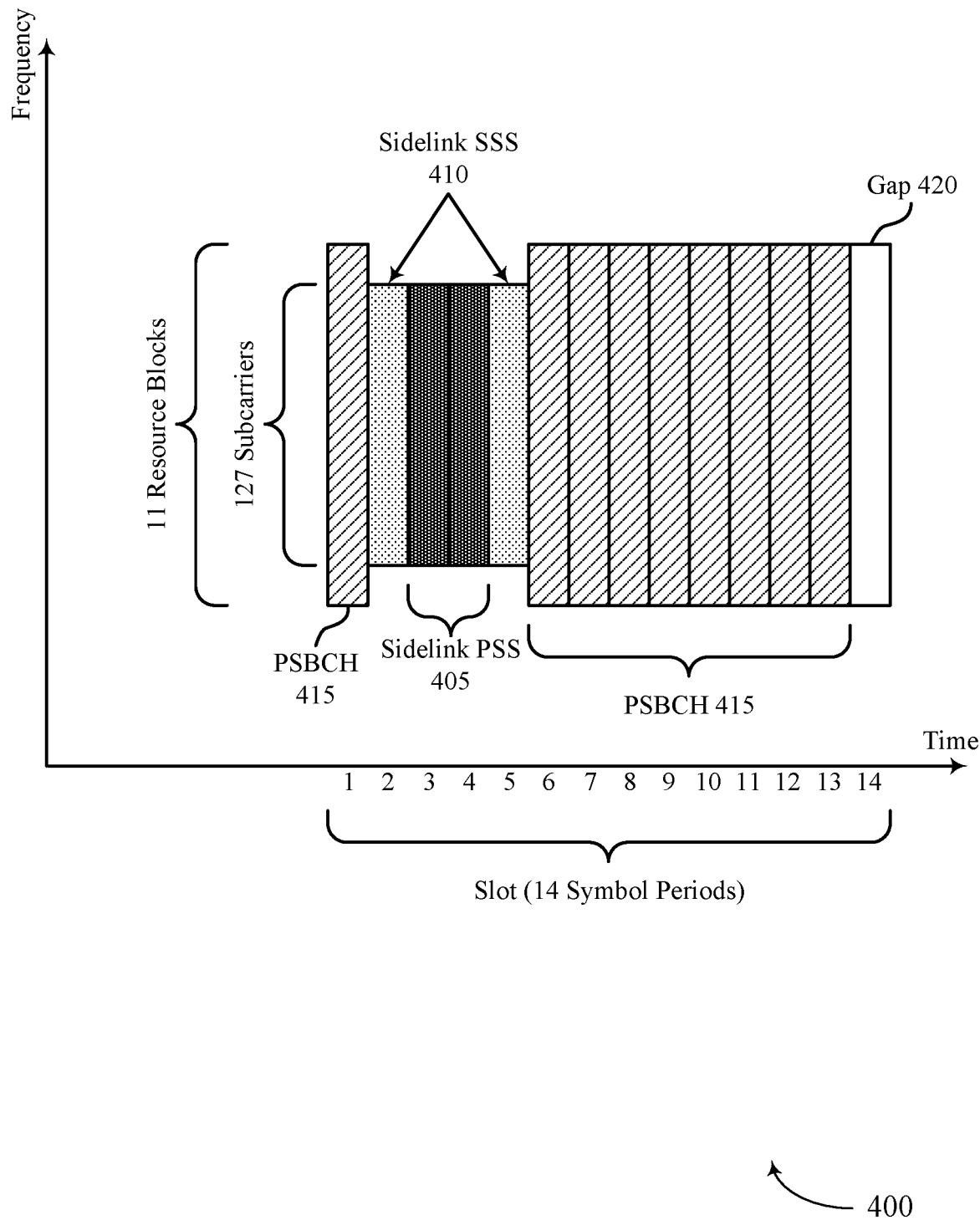
FIG. 4 illustrates an example of a synchronization signal block that supports sidelink synchronization priority rules in accordance with aspects of the present disclosure.

FIG. 4 illustrates an example of a synchronization signal block 400 that supports sidelink synchronization priority rules in accordance with aspects of the present disclosure. In some examples, synchronization signal block 400 may implement aspects of wireless communications systems 100 and/or 200. One or more UEs 115 may use synchronization signal block 400 to transmit and receive synchronization signals with other UEs 115. For example, synchronization signal block 400 may represent an S-SSB (e.g., which may be used for V2X communications).

As shown, synchronization signal block 400 may span 14 symbols (e.g., a slot) in the time-domain and 11 resource blocks (RBs) in the frequency-domain. Additionally, synchronization signal block 400 may include two S-PSSs 405 in two symbols and two S-SSSs 410 in two symbols. The S-PSSs 405 and the S-SSSs 410 may include a set number of subcarriers (e.g., 127 subcarriers) that is less than the 11 RBs allocated for synchronization signal block 400. In some cases, a UE may use a first sequence (e.g., an M-sequence) for the S-PSSs 405 and a second sequence (e.g., a Gold-sequence) for the S-SSSs 410. Synchronization signal block 400 may also include a PSBCH 415 for the rest of the symbols in the slot, except for the last symbol of the slot, which may be used as a gap 420 before a subsequent slot begins. In some cases, synchronization signal block 400 (e.g., an S-SSB) may include a set periodicity (e.g., 160 ms). Additionally or alternatively, the periodicity may be configurable. While the S-PSSs 405 and the S-SSSs 410 are shown to occupy the second through fifth symbols of the slot, the location of the S-PSSs 405 and the S-SSSs 410 may vary and be configured via higher layer signaling (e.g., RRC signaling) or may be predefined. A synchronization source may use synchronization signal block 400 when using an S-SSB based synchronization procedure as described herein.

Figure 5:
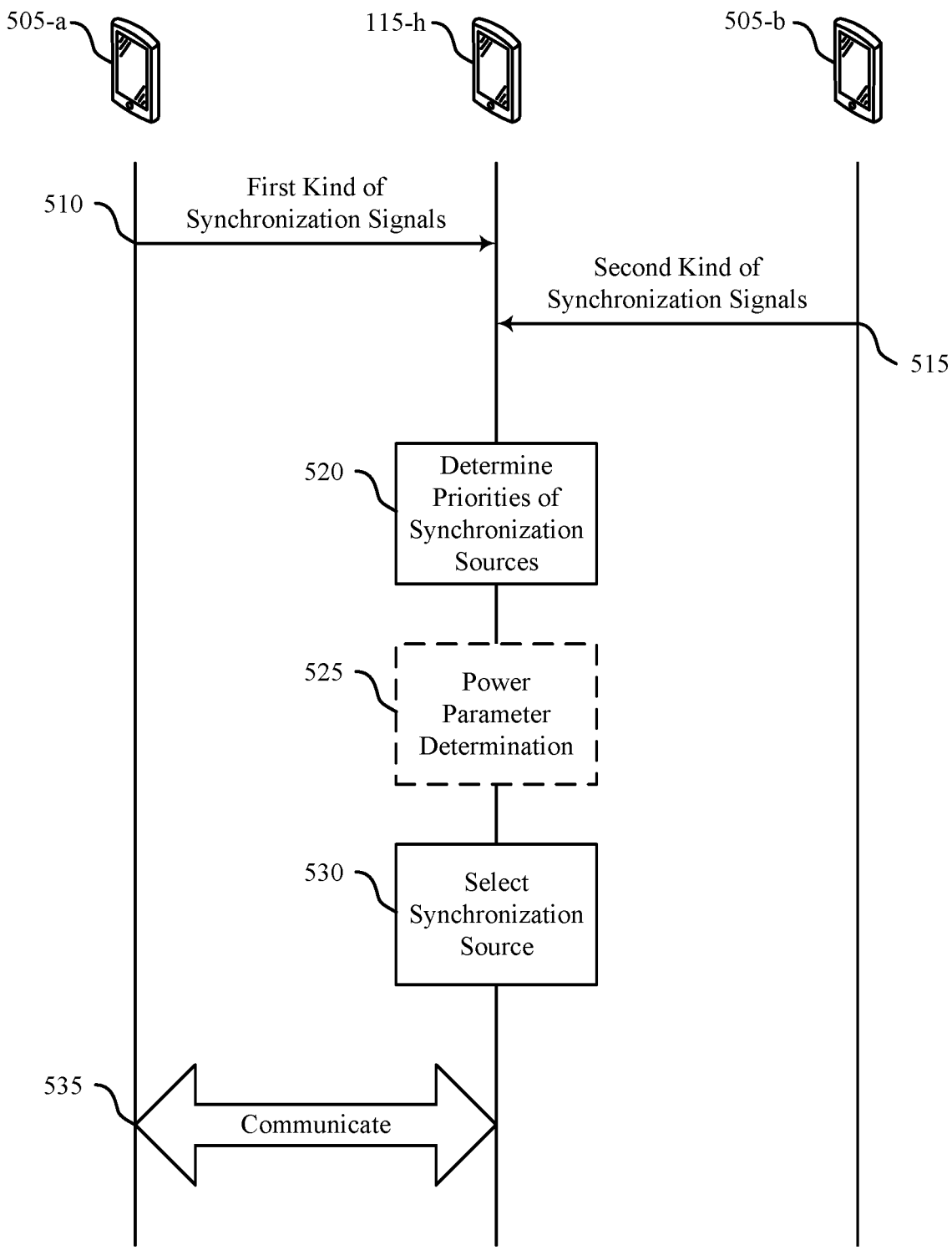
FIG. 5 illustrates an example of a process flow that supports sidelink synchronization priority rules in accordance with aspects of the present disclosure.

FIG. 5 illustrates an example of a process flow 500 that supports sidelink synchronization priority rules in accordance with aspects of the present disclosure. In some examples, process flow 500 may implement aspects of wireless communications systems 100 and/or 200. Process flow 500 may include a UE 115-*h*, a first synchronization source 505-*a* (e.g., a first UE 115), and a second synchronization source 505-*b* (e.g., a second UE 115), which may be examples of UEs 115 as described above with reference to FIGS. 1-4. As described herein, UE 115-*h* may be attempting to synchronize and communicate in a wireless communications system. Accordingly, UE 115-*h* may attempt to synchronize with first synchronization source 505-*a* and/or second synchronization source 505-*b*. While synchronization sources 505 are both shown as UEs 115 in the example of FIG. 5, it is understood that synchronization sources 505 may include any wireless device capable of supporting synchronization (e.g., base station 105, GNSS, etc.).

In the following description of the process flow 500, the operations between UE 115-*h*, first synchronization source 505-*a*, and second synchronization source 505-*b* may be transmitted in a different order than the order shown, or the operations performed by UE 115-*h*, first synchronization source 505-*a*, and second synchronization source 505-*b* may be performed in different orders or at different times. Some operations may also be left out of the process flow 500, or other operations may be added to the process flow 500. It is to be understood that while UE 115-*h*, first synchronization source 505-*a*, and second synchronization source 505-*b* are shown performing a number of the operations of process flow 500, any wireless device may perform the operations shown.

At 510, UE 115-*h* may receive, from first synchronization source 505-*a*, one or more synchronization signals of a first kind. Additionally, at 515, UE 115-*h* may receive, from second synchronization source 505-*b*, one or more synchronization signals of a second kind. In some cases, UE 115-*h* may transmit an indication of a UE capability for UE 115-*h* to support the first kind of synchronization signals and the second kind of synchronization signals, where UE 115-*h* receives the first kind of synchronization signals and the second kind of synchronization signals based on this UE capability. Additionally, the one or more synchronization signals of the first kind may include a sidelink synchronization signal (e.g., S-PSS, S-SSS, PSBCH, S-SSB, etc.) or a DMRS, and the one or more synchronization signals of the second kind may include a different one of the sidelink synchronization signal or the DMRS.

At 520, UE 115-*h* may determine a first priority for first synchronization source 505-*a* based on the one or more synchronization signals of the first kind and a second priority for second synchronization source 505-*b* based on the one or more synchronization signals of the second kind. In some cases, UE 115-*h* may receive, from first synchronization source 505-*a*, synchronization information associated with the one or more synchronization signals of the first kind and may determine whether first synchronization source 505-*a* is connected to a GNSS based on the received synchronization information, where the first priority for first synchronization source 505-*a* is determined based on whether first synchronization source 505-*a* is connected to the GNSS. Accordingly, the synchronization information of the one or more synchronization signals of the first kind may include a PSS ID (e.g., S-PSS ID), an SSS ID (e.g., S-SSS ID), in-coverage information in a PSBCH signal, resources on which the one or more synchronization signals of the first kind are received, or a combination thereof. Additionally, the first priority may be a first level (e.g., P1) if first synchronization source 505-*a* is connected to the GNSS and may be a second level (e.g., P2) that is lower than the first level if first synchronization source 505-*a* is not connected to the GNSS.

Additionally or alternatively, when determining priorities of the synchronization sources 505, UE 115-*h* may receive, from second synchronization source 505-*b*, a synchronization state indication associated with the one or more synchronization signals of the second kind and may determine whether second synchronization source 505-*b* is connected to the GNSS based on the received synchronization state indication, where the second priority for second synchronization source 505-*b* is based on whether second synchronization source 505-*b* is connected to the GNSS. In some cases, the second priority may be a first level (e.g., P1) if second synchronization source 505-*b* is connected to the GNSS and a second level (e.g., P2) that is lower than the first level if second synchronization source 505-*b* is not connected to the GNSS. Additionally, the received synchronization state indication may be included in a MAC CE, MAC header, or a similar indication field in a data transmission from second synchronization source 505-*b*.

At 525, UE 115-*h* may determine, for first synchronization source 505-*a*, a first value of a power parameter and may determine, for second synchronization source 505-*b*, a second value of the power parameter. In some cases, the power parameter may include an RSRP, an RSRQ, a SNR, a SINR, or a combination thereof.

At 530, UE 115-*h* may select first synchronization source 505-*a* or second synchronization source 505-*b* as a synchronization source 505 for UE 115-*h* based on the determined first priority and the determined second priority. Additionally, UE 115-*h* may select first synchronization source 505-*a* or second synchronization source 505-*b* as a synchronization source 505 for UE 115-*h* based on the determined first priority, the determined second priority, the determined first value of the power parameter, and the determined second value of the power parameter. In some cases, UE 115-*h* may identify that the determined first priority is a same priority as the determined second priority and may select first synchronization source 505-*a* or second synchronization source 505-*b* based on a tie-breaking rule (e.g., which synchronization source 505 uses an S-SSB based synchronization procedure).

Additionally or alternatively, the determined second priority may be higher than the determined first priority (e.g., P1 for the determined second priority and P2 for the determined first priority). Accordingly, UE 115-*h* may determine a value of the power parameter for second synchronization source 505-*b* and may compare the determined value of the power parameter to a threshold value. In some cases, UE 115-*h* may then select second synchronization source 505-*b* based on the determined second priority being higher than the determined first priority. Additionally, UE 115-*h* may select second synchronization source 505-*b* based on the determined value of the power parameter satisfying the threshold value as well as the determined second priority being higher than the determined first priority. Alternatively, UE 115-*h* may select first synchronization source 505-*a* based on the second priority being higher than the first priority but the determined value of the power parameter failing to satisfy the threshold value. In some cases, UE 115-*h* may receive an indication of the threshold value (e.g., via RRC signaling).

At 535, UE 115-*h* may communicate with one or more UEs 115 based on synchronizing with the selected synchronization source 505 (e.g., first synchronization source 505-*a* as shown in the example of FIG. 5). For example, UE 115-*h* may communicate with synchronization source 505-*a*, along with any UEs 115 also connected to and synchronized with synchronization source 505-*a*.

Figure 6:
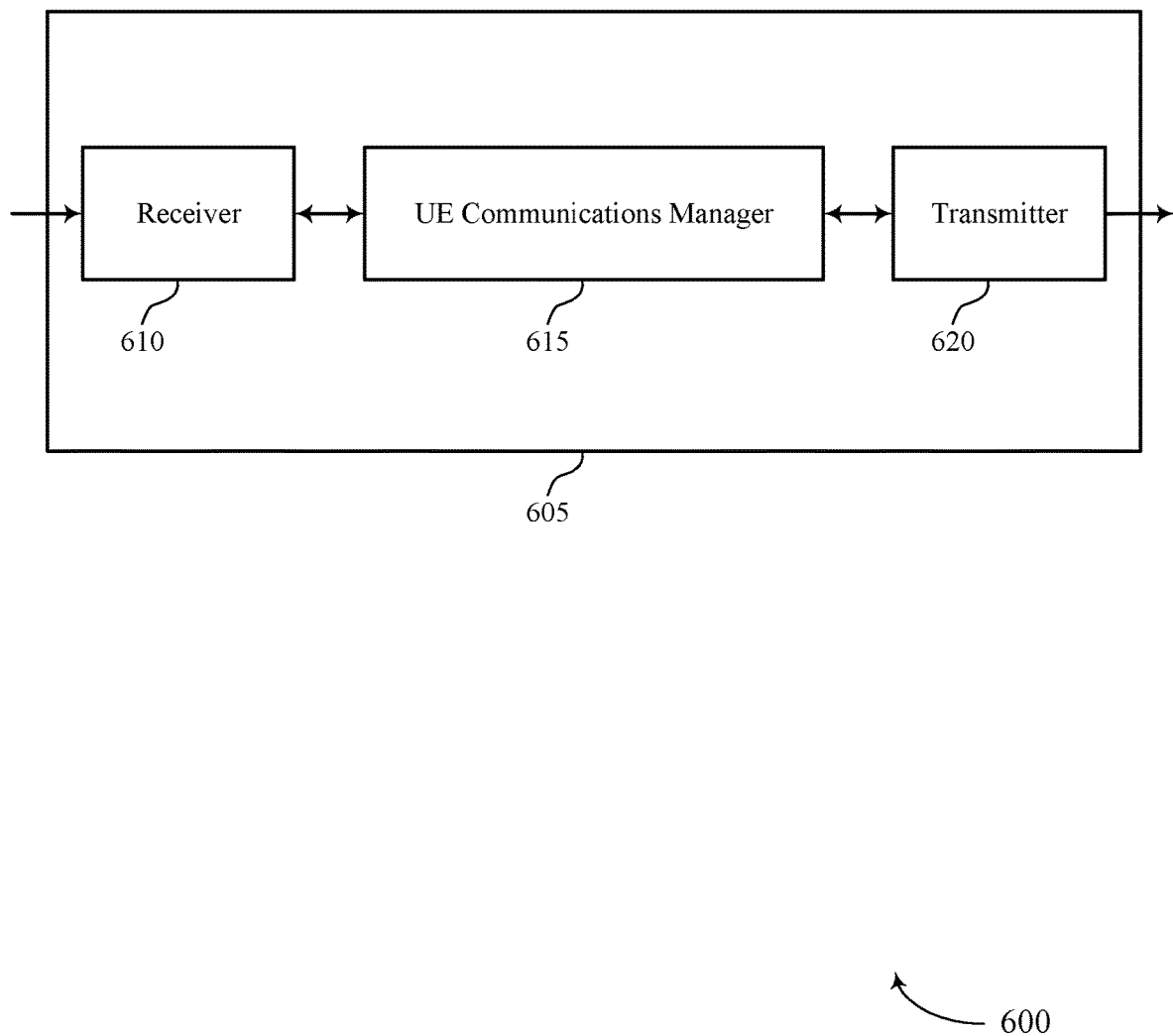
FIGS. 6 and 7 show block diagrams of devices that support sidelink synchronization priority rules in accordance with aspects of the present disclosure.

FIG. 6 shows a block diagram 600 of a device 605 that supports sidelink synchronization priority rules in accordance with aspects of the present disclosure. The device 605 may be an example of aspects of a UE 115 as described herein. The device 605 may include a receiver 610, an UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sidelink synchronization priority rules, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive, from a first synchronization source, one or more synchronization signals of a first kind. Additionally, the UE communications manager 615 may receive, from a second synchronization source, one or more synchronization signals of a second kind. In some cases, the UE communications manager 615 may determine a first priority for the first synchronization source based on the one or more synchronization signals of the first kind and a second priority for the second synchronization source based on the one or more synchronization signals of the second kind. Additionally, the UE communications manager 615 may select the first synchronization source or the second synchronization source as a synchronization source for the UE based on the determined first priority and the determined second priority. Accordingly, the UE communications manager 615 may then communicate with one or more UEs based on synchronizing with the selected synchronization source. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
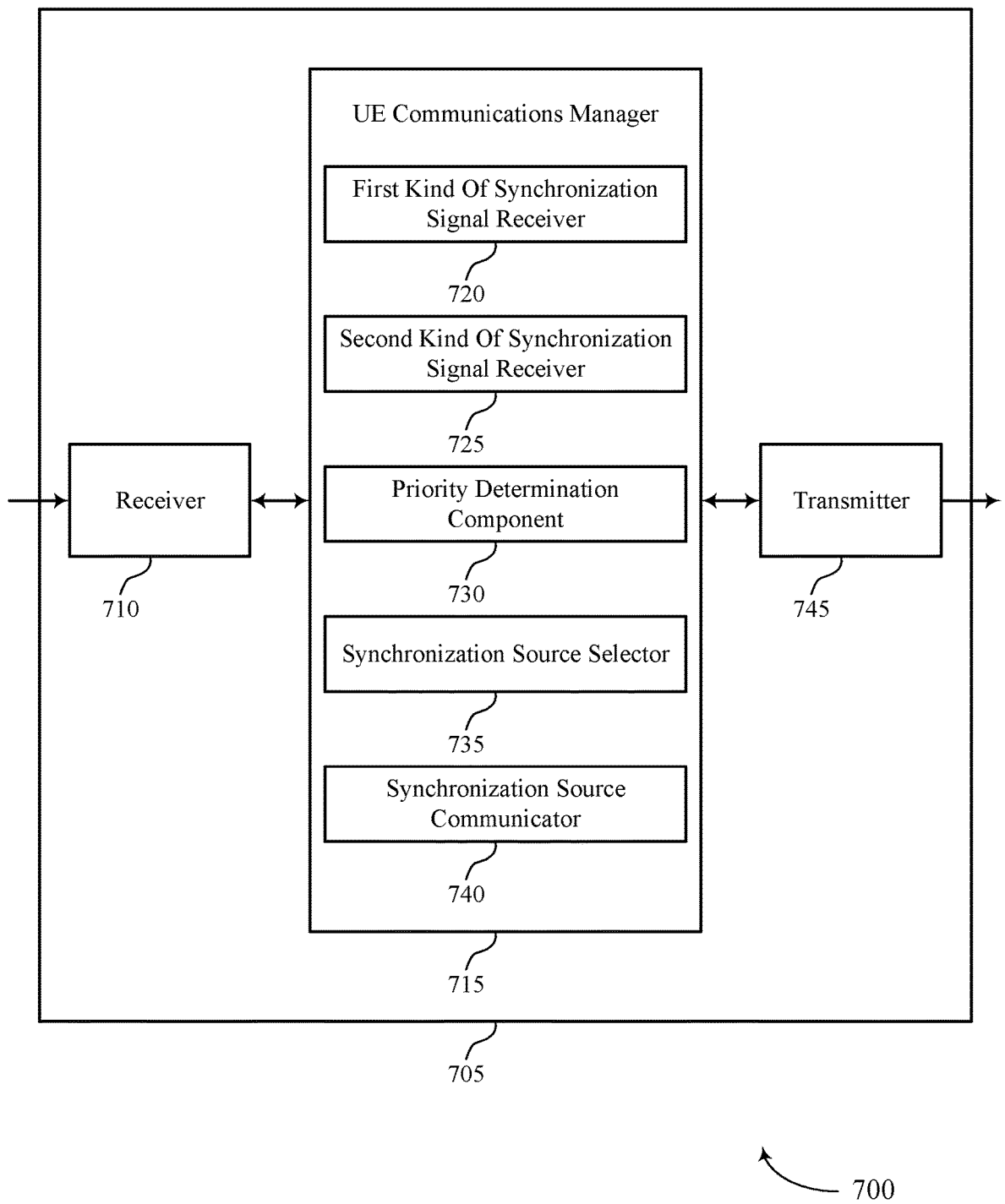

FIG. 7 shows a block diagram 700 of a device 705 that supports sidelink synchronization priority rules in accordance with aspects of the present disclosure. The device 705 may be an example of aspects of a device 605, or a UE 115 as described herein. The device 705 may include a receiver 710, an UE communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to sidelink synchronization priority rules, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a first kind of synchronization signal receiver 720, a second kind of synchronization signal receiver 725, a priority determination component 730, a synchronization source selector 735, and a synchronization source communicator 740. The UE communications manager 715 may be an example of aspects of the UE communications manager 910 described herein.

The first kind of synchronization signal receiver 720 may receive, from a first synchronization source, one or more synchronization signals of a first kind.

The second kind of synchronization signal receiver 725 may receive, from a second synchronization source, one or more synchronization signals of a second kind.

The priority determination component 730 may determine a first priority for the first synchronization source based on the one or more synchronization signals of the first kind and a second priority for the second synchronization source based on the one or more synchronization signals of the second kind.

The synchronization source selector 735 may select the first synchronization source or the second synchronization source as a synchronization source for the UE based on the determined first priority and the determined second priority.

The synchronization source communicator 740 may communicate with one or more UEs based on synchronizing with the selected synchronization source.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
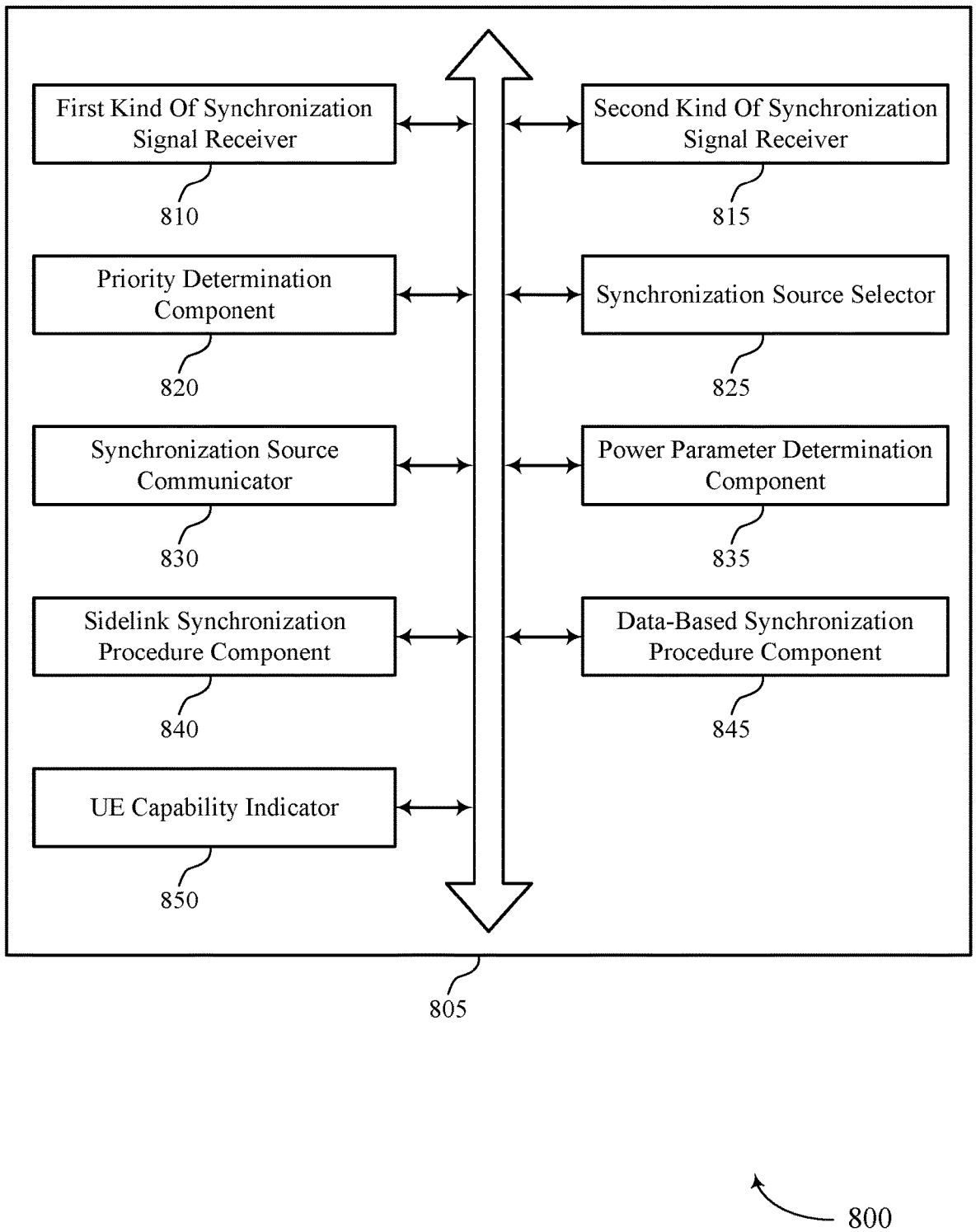
FIG. 8 shows a block diagram of a UE communications manager that supports sidelink synchronization priority rules in accordance with aspects of the present disclosure.

FIG. 8 shows a block diagram 800 of a UE communications manager 805 that supports sidelink synchronization priority rules in accordance with aspects of the present disclosure. The UE communications manager 805 may be an example of aspects of a UE communications manager 615, a UE communications manager 715, or a UE communications manager 910 described herein. The UE communications manager 805 may include a first kind of synchronization signal receiver 810, a second kind of synchronization signal receiver 815, a priority determination component 820, a synchronization source selector 825, a synchronization source communicator 830, a power parameter determination component 835, a sidelink synchronization procedure component 840, a data-based synchronization procedure component 845, and an UE capability indicator 850. Each of these modules may communicate, directly or indirectly, with one another (e.g., via one or more buses).

The first kind of synchronization signal receiver 810 may receive, from a first synchronization source, one or more synchronization signals of a first kind. The second kind of synchronization signal receiver 815 may receive, from a second synchronization source, one or more synchronization signals of a second kind. In some cases, the one or more synchronization signals of the first kind include a sidelink synchronization signal or a DMRS, and the one or more synchronization signals of the second kind include a different one of the sidelink synchronization signal or the DMRS. For example, the sidelink synchronization signal may include a PSS (e.g., S-PSS), an SSS (e.g., S-SSS), a PSBCH signal, or a combination thereof. Additionally, the first synchronization source may include a first UE, and the second synchronization source may include a second UE.

The priority determination component 820 may determine a first priority for the first synchronization source based on the one or more synchronization signals of the first kind and a second priority for the second synchronization source based on the one or more synchronization signals of the second kind.

The synchronization source selector 825 may select the first synchronization source or the second synchronization source as a synchronization source for the UE based on the determined first priority and the determined second priority. In some examples, the synchronization source selector 825 may identify that the determined first priority is a same priority as the determined second priority and may select the first synchronization source or the second synchronization source based on a tie-breaking rule. Additionally or alternatively, when the determined second priority is higher than the determined first priority, the synchronization source selector 825 may determine a value of a power parameter for the second synchronization source and may compare the determined value of the power parameter to a threshold value. Accordingly, the synchronization source selector 825 may select the second synchronization source based on the determined second priority being higher than the determined first priority and the determined value of the power parameter satisfying the threshold value. Alternatively, the synchronization source selector 825 may select the first synchronization source based on the second priority being higher than the first priority and the determined value of the power parameter failing to satisfy the threshold value. In some examples, the synchronization source selector 825 may receive an indication of the threshold value.

The synchronization source communicator 830 may communicate with one or more UEs based on synchronizing with the selected synchronization source.

The power parameter determination component 835 may determine, for the first synchronization source, a first value of a power parameter and may determine, for the second synchronization source, a second value of the power parameter. In some examples, the power parameter determination component 835 may then select the first synchronization source or the second synchronization source as a synchronization source for the UE based on the determined first priority, the determined second priority, the determined first value, and the determined second value. In some cases, the power parameter may include an RSRP, an RSRQ, an SNR, an SINR, or a combination thereof.

The sidelink synchronization procedure component 840 may receive, from the first synchronization source, synchronization information associated with the one or more synchronization signals of the first kind and may determine whether the first synchronization source is connected to a GNSS based on the received synchronization information, where the first priority for the first synchronization source is determined based on whether the first synchronization source is connected to the GNSS. In some cases, the synchronization information of the one or more synchronization signals of the first kind may include a PSS ID (e.g., S-PSS ID), an SSS ID (e.g., S-SSS ID), in-coverage information in a PSBCH signal, resources on which the one or more synchronization signals of the first kind are received, or a combination thereof. Additionally, the first priority may be a first level (e.g., P1) if the first synchronization source is connected to the GNSS and may be a second level (e.g., P2) that is lower than the first level if the first synchronization source is not connected to the GNSS.

The data-based synchronization procedure component 845 may receive, from the second synchronization source, a synchronization state indication associated with the one or more synchronization signals of the second kind and may determine whether the second synchronization source is connected to the GNSS based on the received synchronization state indication, where the second priority for the second synchronization source is based on whether the second synchronization source is connected to the GNSS. In some cases, the second priority may be a first level (e.g., P1) if the second synchronization source is connected to the GNSS and may be a second level (e.g., P2) that is lower than the first level if the second synchronization source is not connected to the GNSS.

The UE capability indicator 850 may transmit an indication of a UE capability for the UE to support the first kind of synchronization signals and the second kind of synchronization signals.

Figure 9:
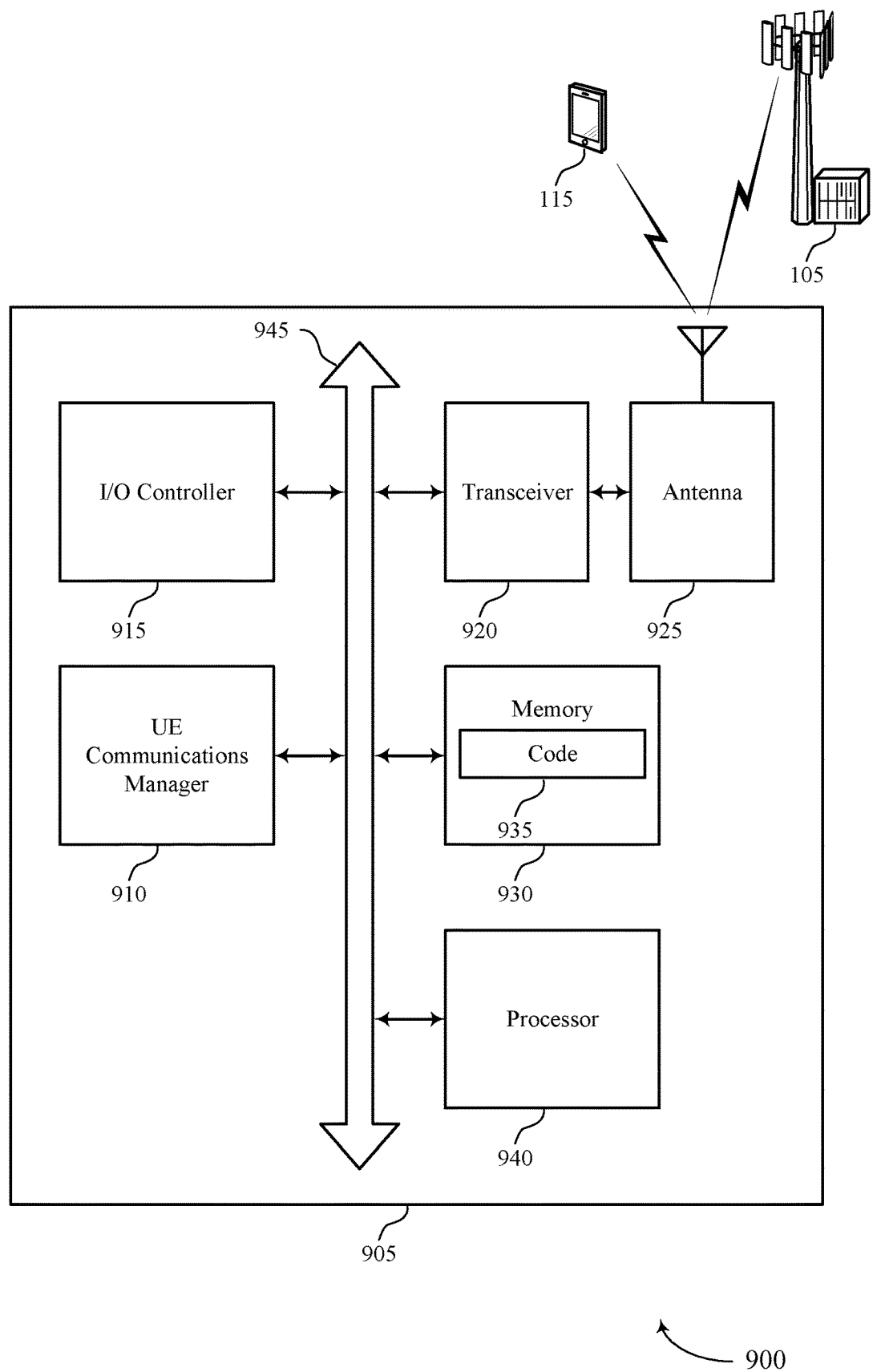
FIG. 9 shows a diagram of a system including a device that supports sidelink synchronization priority rules in accordance with aspects of the present disclosure.

FIG. 9 shows a diagram of a system 900 including a device 905 that supports sidelink synchronization priority rules in accordance with aspects of the present disclosure. The device 905 may be an example of or include the components of device 605, device 705, or a UE 115 as described herein. The device 905 may include components for bi-directional voice and data communications including components for transmitting and receiving communications, including an UE communications manager 910, an I/O controller 915, a transceiver 920, an antenna 925, memory 930, and a processor 940. These components may be in electronic communication via one or more buses (e.g., bus 945).

The UE communications manager 910 may receive, from a first synchronization source, one or more synchronization signals of a first kind. Additionally, the UE communications manager 910 may receive, from a second synchronization source, one or more synchronization signals of a second kind. In some cases, the UE communications manager 910 may determine a first priority for the first synchronization source based on the one or more synchronization signals of the first kind and a second priority for the second synchronization source based on the one or more synchronization signals of the second kind. Additionally, the UE communications manager 910 may select the first synchronization source or the second synchronization source as a synchronization source for the UE based on the determined first priority and the determined second priority. Accordingly, the UE communications manager 910 may communicate with one or more UEs based on synchronizing with the selected synchronization source.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink synchronization priority rules).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
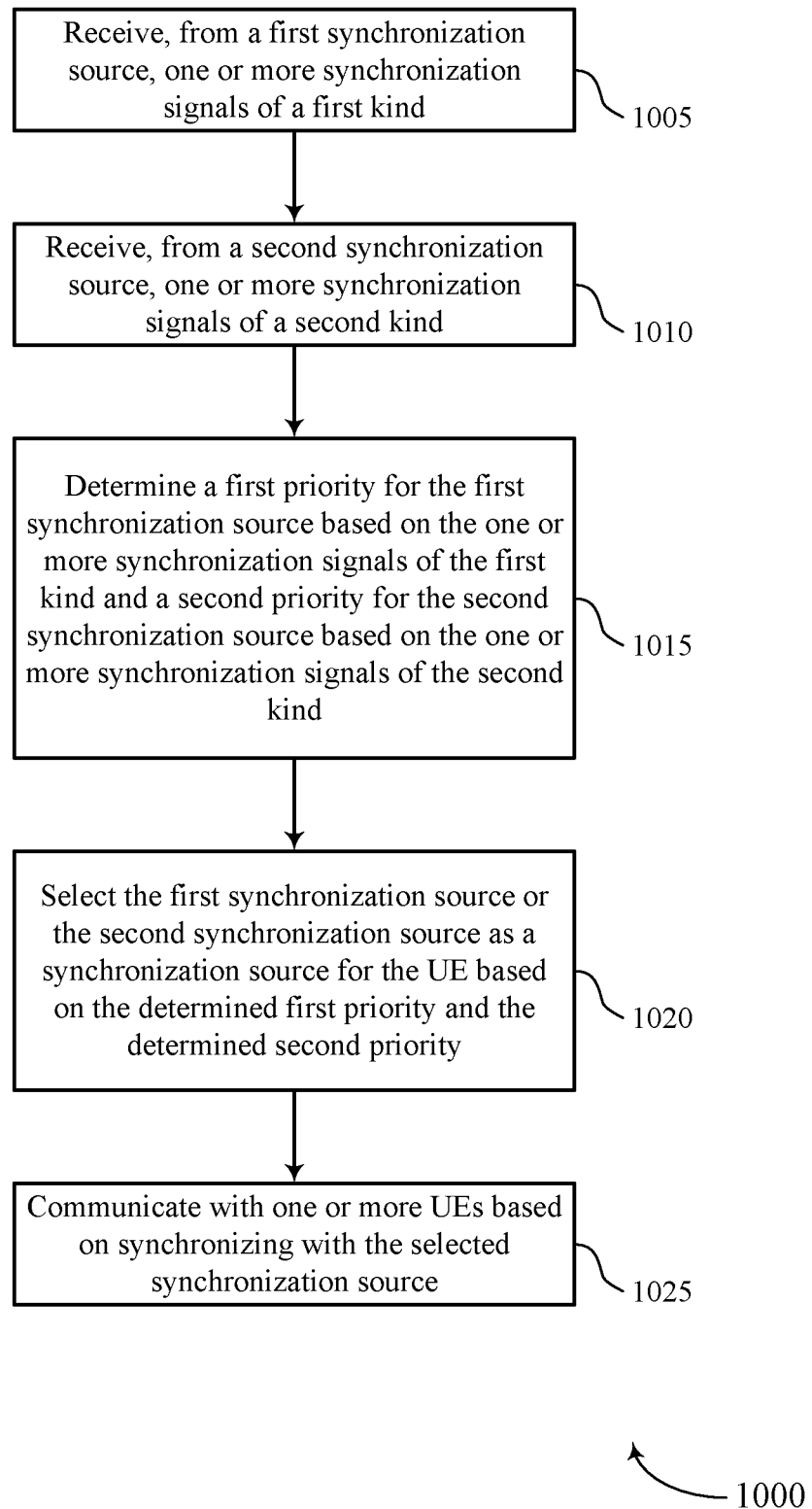
FIGS. 10 through 12 show flowcharts illustrating methods that support sidelink synchronization priority rules in accordance with aspects of the present disclosure.

FIG. 10 shows a flowchart illustrating a method 1000 that supports sidelink synchronization priority rules in accordance with aspects of the present disclosure. The operations of method 1000 may be implemented by a UE 115 or its components as described herein. For example, the operations of method 1000 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may receive, from a first synchronization source, one or more synchronization signals of a first kind. The operations of 1005 may be performed according to the methods described herein. In some examples, aspects of the operations of 1005 may be performed by a first kind of synchronization signal receiver as described with reference to FIGS. 6 through 9.

At 1010, the UE may receive, from a second synchronization source, one or more synchronization signals of a second kind. The operations of 1010 may be performed according to the methods described herein. In some examples, aspects of the operations of 1010 may be performed by a second kind of synchronization signal receiver as described with reference to FIGS. 6 through 9.

At 1015, the UE may determine a first priority for the first synchronization source based on the one or more synchronization signals of the first kind and a second priority for the second synchronization source based on the one or more synchronization signals of the second kind. The operations of 1015 may be performed according to the methods described herein. In some examples, aspects of the operations of 1015 may be performed by a priority determination component as described with reference to FIGS. 6 through 9.

At 1020, the UE may select the first synchronization source or the second synchronization source as a synchronization source for the UE based on the determined first priority and the determined second priority. The operations of 1020 may be performed according to the methods described herein. In some examples, aspects of the operations of 1020 may be performed by a synchronization source selector as described with reference to FIGS. 6 through 9.

At 1025, the UE may communicate with one or more UEs based on synchronizing with the selected synchronization source. The operations of 1025 may be performed according to the methods described herein. In some examples, aspects of the operations of 1025 may be performed by a synchronization source communicator as described with reference to FIGS. 6 through 9.

Figure 11:
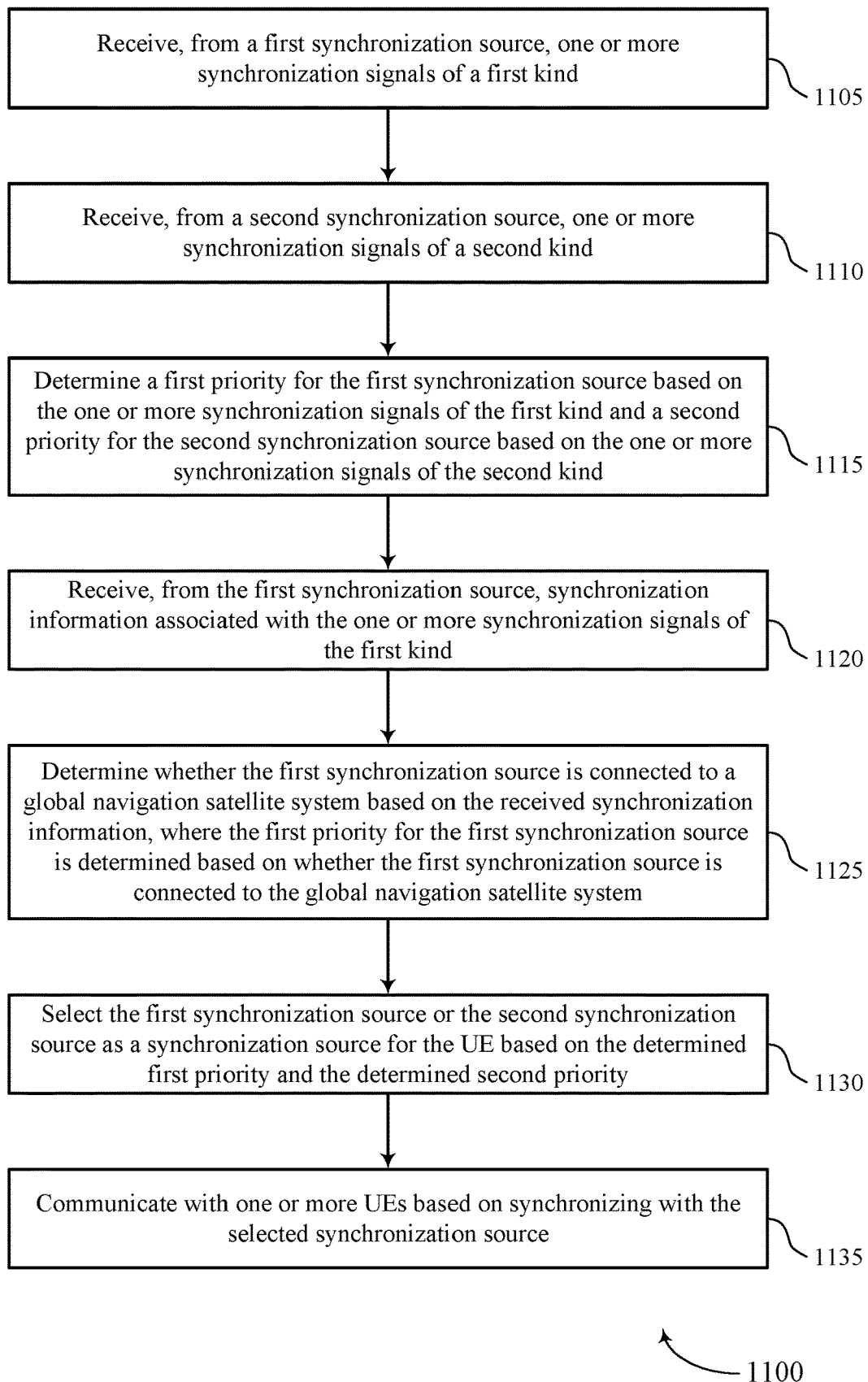

FIG. 11 shows a flowchart illustrating a method 1100 that supports sidelink synchronization priority rules in accordance with aspects of the present disclosure. The operations of method 1100 may be implemented by a UE 115 or its components as described herein. For example, the operations of method 1100 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may receive, from a first synchronization source, one or more synchronization signals of a first kind. The operations of 1105 may be performed according to the methods described herein. In some examples, aspects of the operations of 1105 may be performed by a first kind of synchronization signal receiver as described with reference to FIGS. 6 through 9.

At 1110, the UE may receive, from a second synchronization source, one or more synchronization signals of a second kind. The operations of 1110 may be performed according to the methods described herein. In some examples, aspects of the operations of 1110 may be performed by a second kind of synchronization signal receiver as described with reference to FIGS. 6 through 9.

At 1115, the UE may determine a first priority for the first synchronization source based on the one or more synchronization signals of the first kind and a second priority for the second synchronization source based on the one or more synchronization signals of the second kind. The operations of 1115 may be performed according to the methods described herein. In some examples, aspects of the operations of 1115 may be performed by a priority determination component as described with reference to FIGS. 6 through 9.

At 1120, the UE may receive, from the first synchronization source, synchronization information associated with the one or more synchronization signals of the first kind. The operations of 1120 may be performed according to the methods described herein. In some examples, aspects of the operations of 1120 may be performed by a sidelink synchronization procedure component as described with reference to FIGS. 6 through 9.

At 1125, the UE may determine whether the first synchronization source is connected to a global navigation satellite system based on the received synchronization information, where the first priority for the first synchronization source is determined based on whether the first synchronization source is connected to the global navigation satellite system. The operations of 1125 may be performed according to the methods described herein. In some aspects of the operations of 1125 may be performed by a sidelink synchronization procedure component as described with reference to FIGS. 6 through 9.

At 1130, the UE may select the first synchronization source or the second synchronization source as a synchronization source for the UE based on the determined first priority and the determined second priority. The operations of 1130 may be performed according to the methods described herein. In some examples, aspects of the operations of 1130 may be performed by a synchronization source selector as described with reference to FIGS. 6 through 9.

At 1135, the UE may communicate with one or more UEs based on synchronizing with the selected synchronization source. The operations of 1135 may be performed according to the methods described herein. In some examples, aspects of the operations of 1135 may be performed by a synchronization source communicator as described with reference to FIGS. 6 through 9.

Figure 12:
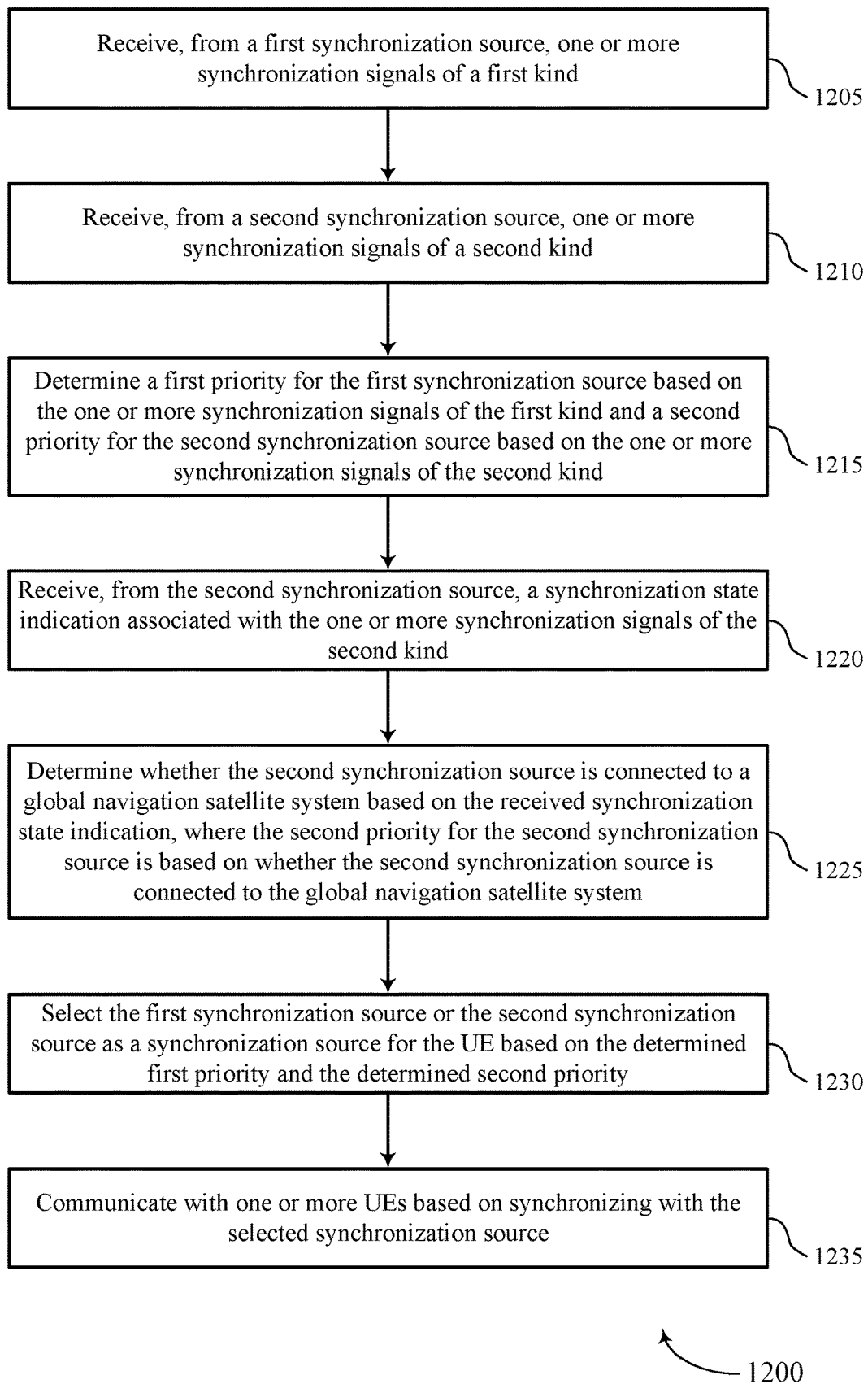

FIG. 12 shows a flowchart illustrating a method 1200 that supports sidelink synchronization priority rules in accordance with aspects of the present disclosure. The operations of method 1200 may be implemented by a UE 115 or its components as described herein. For example, the operations of method 1200 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may receive, from a first synchronization source, one or more synchronization signals of a first kind. The operations of 1205 may be performed according to the methods described herein. In some examples, aspects of the operations of 1205 may be performed by a first kind of synchronization signal receiver as described with reference to FIGS. 6 through 9.

At 1210, the UE may receive, from a second synchronization source, one or more synchronization signals of a second kind. The operations of 1210 may be performed according to the methods described herein. In some examples, aspects of the operations of 1210 may be performed by a second kind of synchronization signal receiver as described with reference to FIGS. 6 through 9.

At 1215, the UE may determine a first priority for the first synchronization source based on the one or more synchronization signals of the first kind and a second priority for the second synchronization source based on the one or more synchronization signals of the second kind. The operations of 1215 may be performed according to the methods described herein. In some examples, aspects of the operations of 1215 may be performed by a priority determination component as described with reference to FIGS. 6 through 9.

At 1220, the UE may receive, from the second synchronization source, a synchronization state indication associated with the one or more synchronization signals of the second kind. The operations of 1220 may be performed according to the methods described herein. In some examples, aspects of the operations of 1220 may be performed by a data-based synchronization procedure component as described with reference to FIGS. 6 through 9.

At 1225, the UE may determine whether the second synchronization source is connected to a global navigation satellite system based on the received synchronization state indication, where the second priority for the second synchronization source is based on whether the second synchronization source is connected to the global navigation satellite system. The operations of 1225 may be performed according to the methods described herein. In some examples, aspects of the operations of 1225 may be performed by a data-based synchronization procedure component as described with reference to FIGS. 6 through 9.

At 1230, the UE may select the first synchronization source or the second synchronization source as a synchronization source for the UE based on the determined first priority and the determined second priority. The operations of 1230 may be performed according to the methods described herein. In some examples, aspects of the operations of 1230 may be performed by a synchronization source selector as described with reference to FIGS. 6 through 9.

At 1235, the UE may communicate with one or more UEs based on synchronizing with the selected synchronization source. The operations of 1235 may be performed according to the methods described herein. In some examples, aspects of the operations of 1235 may be performed by a synchronization source communicator as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting, to one or more synchronization sources comprising at least a first synchronization source and a second synchronization source, an indication of a UE capability for the UE to support one or more synchronization signals of a first kind and one or more synchronization signals of a second kind;
    receiving, from the first synchronization source, one or more synchronization signals of the first kind;
    receiving, from the second synchronization source, one or more synchronization signals of the second kind, the one or more synchronization sources comprising the first synchronization source and the second synchronization source;
    determining a first priority for the first synchronization source based at least in part on the one or more synchronization signals of the first kind and a second priority for the second synchronization source based at least in part on the one or more synchronization signals of the second kind;
    selecting the first synchronization source or the second synchronization source as a synchronization source for the UE based at least in part on the determined first priority and the determined second priority, wherein selecting the first synchronization source or the second synchronization source comprises determining whether the first synchronization source or the second synchronization source is directly or indirectly connected to a global navigation satellite system based at least in part on a sidelink synchronization signal identifier, or a media access control control element, or both; and
    communicating with one or more UEs based at least in part on synchronizing with the selected synchronization source.

2. The method of claim 1, wherein selecting the first synchronization source or the second synchronization source for the UE comprises:
    determining, for the first synchronization source, a first value of a power parameter;
    determining, for the second synchronization source, a second value of the power parameter; and
    selecting the first synchronization source or the second synchronization source as the synchronization source for the UE based at least in part on the determined first priority, the determined second priority, the determined first value, and the determined second value.

3. The method of claim 2, wherein the power parameter comprises a reference signal received power, a reference signal received quality, a signal-to-noise ratio, a signal-to-interference-plus-noise ratio, or a combination thereof.

4. The method of claim 1, further comprising:
    receiving, from the first synchronization source, synchronization information associated with the one or more synchronization signals of the first kind; and
    determining whether the first synchronization source is connected to the global navigation satellite system based at least in part on the received synchronization information, wherein the first priority for the first synchronization source is determined based at least in part on whether the first synchronization source is connected to the global navigation satellite system.

5. The method of claim 4, wherein the synchronization information of the one or more synchronization signals of the first kind comprises a primary synchronization signal identification, a secondary synchronization signal identification, in-coverage information in a physical sidelink broadcast channel signal, resources on which the one or more synchronization signals of the first kind are received, or a combination thereof.

6. The method of claim 4, wherein the first priority is a first level if the first synchronization source is connected to the global navigation satellite system and a second level that is lower than the first level if the first synchronization source is not connected to the global navigation satellite system.

7. The method of claim 1, further comprising:
receiving, from the second synchronization source, a synchronization state indication associated with the one or more synchronization signals of the second kind; and
determining whether the second synchronization source is connected to the global navigation satellite system based at least in part on the received synchronization state indication, wherein the second priority for the second synchronization source is based at least in part on whether the second synchronization source is connected to the global navigation satellite system.

8. The method of claim 7, wherein the second priority is a first level if the second synchronization source is connected to the global navigation satellite system and a second level that is lower than the first level if the second synchronization source is not connected to the global navigation satellite system.

9. The method of claim 1, wherein selecting the first synchronization source or the second synchronization source further comprises:
identifying that the determined first priority is a same priority as the determined second priority; and
selecting the first synchronization source or the second synchronization source based at least in part on a tie-breaking rule.

10. The method of claim 1, wherein the determined second priority is higher than the determined first priority, the method further comprising:
determining a value of a power parameter for the second synchronization source; and
comparing the determined value of the power parameter to a threshold value.

11. The method of claim 10, wherein selecting the first synchronization source or the second synchronization source comprises:
selecting the second synchronization source based at least in part on the determined second priority being higher than the determined first priority, and the determined value of the power parameter satisfying the threshold value.

12. The method of claim 10, wherein selecting the first synchronization source or the second synchronization source comprises:
selecting the first synchronization source based at least in part on the second priority being higher than the first priority, and the determined value of the power parameter failing to satisfy the threshold value.

13. The method of claim 10, further comprising:
receiving an indication of the threshold value.

14. The method of claim 1, wherein:
the one or more synchronization signals of the first kind comprise a sidelink synchronization signal or a demodulation reference signal; and
the one or more synchronization signals of the second kind comprise a different one of the sidelink synchronization signal or the demodulation reference signal.

15. The method of claim 14, wherein the sidelink synchronization signal comprises a primary synchronization signal, a secondary synchronization signal, and a physical sidelink broadcast channel signal.

16. The method of claim 1, wherein:
the first synchronization source comprises a first UE; and
the second synchronization source comprises a second UE.

17. The method of claim 1, wherein:
the first synchronization source is connected indirectly to the global navigation satellite system and uses a sidelink synchronization signal block synchronization procedure; and
the second synchronization source is connected directly to the global navigation satellite system and uses a non-sidelink synchronization signal block synchronization procedure.

18. An apparatus for wireless communications at a user equipment (UE), comprising: a processor, memory coupled with the processor; and instructions stored in the memory and executable by the processor to cause the apparatus to:
transmit, to one or more synchronization sources comprising at least a first synchronization source and a second synchronization source, an indication of a UE capability for the UE to support one or more synchronization signals of a first kind and one or more synchronization signals of a second kind;
receive, from the first synchronization source, one or more synchronization signals of the first kind;
receive, from the second synchronization source, one or more synchronization signals of the second kind;
determine a first priority for the first synchronization source based at least in part on the one or more synchronization signals of the first kind and a second priority for the second synchronization source based at least in part on the one or more synchronization signals of the second kind;
select the first synchronization source or the second synchronization source as a synchronization source for the UE based at least in part on the determined first priority and the determined second priority, wherein selecting the first synchronization source or the second synchronization source comprises determining whether the first synchronization source or the second synchronization source is directly or indirectly connected to a global navigation satellite system based at least in part on a sidelink synchronization signal identifier, or a media access control control element, or both; and
communicate with one or more UEs based on synchronizing with the selected synchronization source.

19. The apparatus of claim 18, wherein the instructions to select the first synchronization source or the second synchronization source for the UE are executable by the processor to cause the apparatus to:
determine, for the first synchronization source, a first value of a power parameter;
determine, for the second synchronization source, a second value of the power parameter; and
select the first synchronization source or the second synchronization source as the synchronization source for the UE based at least in part on the determined first priority, the determined second priority, the determined first value, and the determined second value.

20. The apparatus of claim 19, wherein the power parameter comprises a reference signal received power, a reference signal received quality, a signal-to-noise ratio, a signal-to-interference-plus-noise ratio, or a combination thereof.

21. The apparatus of claim 18, wherein the instructions are further executable by the processor to cause the apparatus to:
  receive, from the first synchronization source, synchronization information associated with the one or more synchronization signals of the first kind; and
  determine whether the first synchronization source is connected to the global navigation satellite system based at least in part on the received synchronization information, wherein the first priority for the first synchronization source is determined based at least in part on whether the first synchronization source is connected to the global navigation satellite system.

22. The apparatus of claim 21, wherein the synchronization information of the one or more synchronization signals of the first kind comprises a primary synchronization signal identification, a secondary synchronization signal identification, in-coverage information in a physical sidelink broadcast channel signal, resources on which the one or more synchronization signals of the first kind are received, or a combination thereof.

23. The apparatus of claim 21, wherein the first priority is a first level if the first synchronization source is connected to the global navigation satellite system and a second level that is lower than the first level if the first synchronization source is not connected to the global navigation satellite system.

24. The apparatus of claim 18, wherein the instructions are further executable by the processor to cause the apparatus to:
  receive, from the second synchronization source, a synchronization state indication associated with the one or more synchronization signals of the second kind; and
  determine whether the second synchronization source is connected to the global navigation satellite system based at least in part on the received synchronization state indication, wherein the second priority for the second synchronization source is based at least in part on whether the second synchronization source is connected to the global navigation satellite system.

25. The apparatus of claim 24, wherein the second priority is a first level if the second synchronization source is connected to the global navigation satellite system and a second level that is lower than the first level if the second synchronization source is not connected to the global navigation satellite system.

26. The apparatus of claim 18, wherein the instructions to select the first synchronization source or the second synchronization source further are executable by the processor to cause the apparatus to:
  identify that the determined first priority is a same priority as the determined second priority; and
  select the first synchronization source or the second synchronization source based at least in part on a tie-breaking rule.

27. The apparatus of claim 18, wherein the determined second priority is higher than the determined first priority, and the instructions are further executable by the processor to cause the apparatus to:
  determine a value of a power parameter for the second synchronization source; and
  compare the determined value of the power parameter to a threshold value.

28. The apparatus of claim 27, wherein the instructions to select the first synchronization source or the second synchronization source are executable by the processor to cause the apparatus to:
  select the second synchronization source based at least in part on the determined second priority being higher than the determined first priority, and the determined value of the power parameter satisfying the threshold value.

29. The apparatus of claim 27, wherein the instructions to select the first synchronization source or the second synchronization source are executable by the processor to cause the apparatus to:
  select the first synchronization source based at least in part on the second priority being higher than the first priority, and the determined value of the power parameter failing to satisfy the threshold value.

30. The apparatus of claim 27, wherein the instructions are further executable by the processor to cause the apparatus to:
  receive an indication of the threshold value.

31. The apparatus of claim 18, wherein:
  the one or more synchronization signals of the first kind comprise a sidelink synchronization signal or a demodulation reference signal; and
  the one or more synchronization signals of the second kind comprise a different one of the sidelink synchronization signal or the demodulation reference signal.

32. The apparatus of claim 31, wherein the sidelink synchronization signal comprises a primary synchronization signal, a secondary synchronization signal, and a physical sidelink broadcast channel signal.

33. The apparatus of claim 18, wherein:
  the first synchronization source comprises a first UE; and
  the second synchronization source comprises a second UE.

34. An apparatus for wireless communications at a user equipment (UE), comprising:
  means for transmitting, to one or more synchronization sources comprising at least a first synchronization source and a second synchronization source, an indication of a UE capability for the UE to support one or more synchronization signals of a first kind and one or more synchronization signals of a second kind;
  means for receiving, from the first synchronization source, one or more synchronization signals of the first kind;
  means for receiving, from the second synchronization source, one or more synchronization signals of the second kind;
  means for determining a first priority for the first synchronization source based at least in part on the one or more synchronization signals of the first kind and a second priority for the second synchronization source based at least in part on the one or more synchronization signals of the second kind;
  means for selecting the first synchronization source or the second synchronization source as a synchronization source for the UE based at least in part on the determined first priority and the determined second priority, wherein selecting the first synchronization source or the second synchronization source comprises determining whether the first synchronization source or the second synchronization source is directly or indirectly connected to a global navigation satellite system based at least in part on a sidelink synchronization signal identifier, or a media access control control element, or both; and
  means for communicating with one or more UEs based on synchronizing with the selected synchronization source.

35. The apparatus of claim 34, wherein the means for selecting first synchronization source or the second synchronization source for the UE comprises:
 means for determining, for the first synchronization source, a first value of a power parameter;
 means for determining, for the second synchronization source, a second value of the power parameter; and
 means for selecting the first synchronization source or the second synchronization source as the synchronization source for the UE based at least in part on the determined first priority, the determined second priority, the determined first value, and the determined second value.

36. The apparatus of claim 34, further comprising:
 means for receiving, from the first synchronization source, synchronization information associated with the one or more synchronization signals of the first kind; and
 means for determining whether the first synchronization source is connected to the global navigation satellite system based at least in part on the received synchronization information, wherein the first priority for the first synchronization source is determined based at least in part on whether the first synchronization source is connected to the global navigation satellite system.

37. The apparatus of claim 34, further comprising:
 means for receiving, from the second synchronization source, a synchronization state indication associated with the one or more synchronization signals of the second kind; and
 means for determining whether the second synchronization source is connected to the global navigation satellite system based at least in part on the received synchronization state indication, wherein the second priority for the second synchronization source is based at least in part on whether the second synchronization source is connected to the global navigation satellite system.

38. The apparatus of claim 34, wherein the means for selecting the first synchronization source or the second synchronization source further comprises:
 means for identifying that the determined first priority is a same priority as the determined second priority; and
 means for selecting the first synchronization source or the second synchronization source based at least in part on a tie-breaking rule.

39. The apparatus of claim 34, wherein the determined second priority is higher than the determined first priority, the apparatus further comprising:
 means for determining a value of a power parameter for the second synchronization source; and
 means for comparing the determined value of the power parameter to a threshold value.

40. The apparatus of claim 34, wherein:
 the one or more synchronization signals of the first kind comprise a sidelink synchronization signal or a demodulation reference signal; and
 the one or more synchronization signals of the second kind comprise a different one of the sidelink synchronization signal or the demodulation reference signal.

41. The apparatus of claim 34, wherein:
 the first synchronization source comprises a first UE; and
 the second synchronization source comprises a second UE.

42. A non-transitory computer-readable medium storing code for wireless communications at a user equipment (UE), the code comprising instructions executable by a processor to:
 transmit, to one or more synchronization sources comprising at least a first synchronization source and a second synchronization source, an indication of a UE capability for the UE to support one or more synchronization signals of a first kind and one or more synchronization signals of a second kind;
 receive, from the first synchronization source, one or more synchronization signals of the first kind;
 receive, from the second synchronization source, one or more synchronization signals of the second kind;
 determine a first priority for the first synchronization source based at least in part on the one or more synchronization signals of the first kind and a second priority for the second synchronization source based at least in part on the one or more synchronization signals of the second kind;
 select the first synchronization source or the second synchronization source as a synchronization source for the UE based at least in part on the determined first priority and the determined second priority, wherein selecting the first synchronization source or the second synchronization source comprises determining whether the first synchronization source or the second synchronization source is directly or indirectly connected to a global navigation satellite system based at least in part on a sidelink synchronization signal identifier, or a media access control control element, or both; and
 communicate with one or more UEs based on synchronizing with the selected synchronization source.

\* \* \* \* \*